United States Patent [19]

Ditto et al.

[11] Patent Number: 4,888,717

[45] Date of Patent: Dec. 19, 1989

[54] WEB LATERAL POSITION CONTROL APPARATUS AND METHOD

[75] Inventors: James W. Ditto, Golden; James W. Jensen, Boulder, both of Colo.

[73] Assignee: Adolph Coors Company, Golden, Colo.

[21] Appl. No.: 902,183

[22] Filed: Aug. 29, 1986

Related U.S. Application Data

[63] Continuation-in-part of Ser. No. 667,869, Nov. 2, 1984, Pat. No. 4,610,739.

[51] Int. Cl.⁴ .................................................. B65B 41/18
[52] U.S. Cl. ........................................ 364/559; 364/560; 364/563; 364/469; 226/3; 156/361; 156/495
[58] Field of Search ............... 364/559, 561, 562, 563, 364/469, 470; 226/3, 15, 16, 20, 21; 156/324, 361, 64, 495

[56] References Cited

U.S. PATENT DOCUMENTS

| | | | |
|---|---|---|---|
| 3,679,112 | 7/1972 | Black et al. | 226/18 |
| 3,701,464 | 10/1972 | Crum | 226/3 |
| 3,774,271 | 11/1973 | Depuy et al. | 26/75 |
| 3,915,090 | 10/1975 | Horst et al. | 101/426 |
| 4,054,251 | 10/1977 | Henderson et al. | 242/57.1 |
| 4,135,664 | 1/1979 | Resh | 235/475 |
| 4,201,132 | 5/1980 | Zimmer et al. | 101/118 |
| 4,231,835 | 11/1980 | Ensley et al. | 156/361 |
| 4,243,167 | 1/1981 | Sander | 226/21 |
| 4,254,173 | 3/1981 | Peer, Jr. | 428/204 |
| 4,316,566 | 2/1982 | Arleth et al. | 226/2 |
| 4,322,026 | 3/1982 | Young, Jr. | 226/15 |
| 4,392,910 | 7/1983 | Tokuno et al. | 156/361 |
| 4,484,079 | 11/1984 | Betz et al. | 250/548 |
| 4,485,982 | 12/1984 | St. John et al. | 242/57.1 |
| 4,496,417 | 1/1985 | Haake et al. | 226/27 |
| 4,572,752 | 2/1986 | Jensen et al. | 156/64 |
| 4,610,739 | 9/1986 | Jensen | 156/64 |

FOREIGN PATENT DOCUMENTS

| | | |
|---|---|---|
| 0110669 | 11/1983 | European Pat. Off. . |
| 962166 | 4/1957 | Fed. Rep. of Germany . |
| 1041976 | 10/1958 | Fed. Rep. of Germany . |
| 2643481 | 9/1976 | Fed. Rep. of Germany . |
| 60-48357 | 3/1985 | Japan . |
| 60-129261 | 7/1985 | Japan . |
| 622827 | 5/1949 | United Kingdom . |
| 980471 | 1/1965 | United Kingdom . |
| 2059340 | 4/1981 | United Kingdom . |
| 2065871 | 7/1981 | United Kingdom . |

*Primary Examiner*—Parshotam S. Lall
*Assistant Examiner*—Ellis B. Ramirez
*Attorney, Agent, or Firm*—Klaas & Law

[57] ABSTRACT

A method and apparatus controlling the lateral position of a moving web of material having a central longitudinally extending web axis extending generally parallel to the direction of movement of the web so as to maintain the central longitudinally extending axis of the web at a substantial constant lateral position relative a fixed longitudinally extending axis associated with a fixed web alignment station based upon the detected longitudinal distance between certain portions of a series of longitudinally spaced apart, substantially identical, generally transversely extending indicia in a longitudinally extending indicia path parallel to the central longitudinal axis of the web.

12 Claims, 12 Drawing Sheets

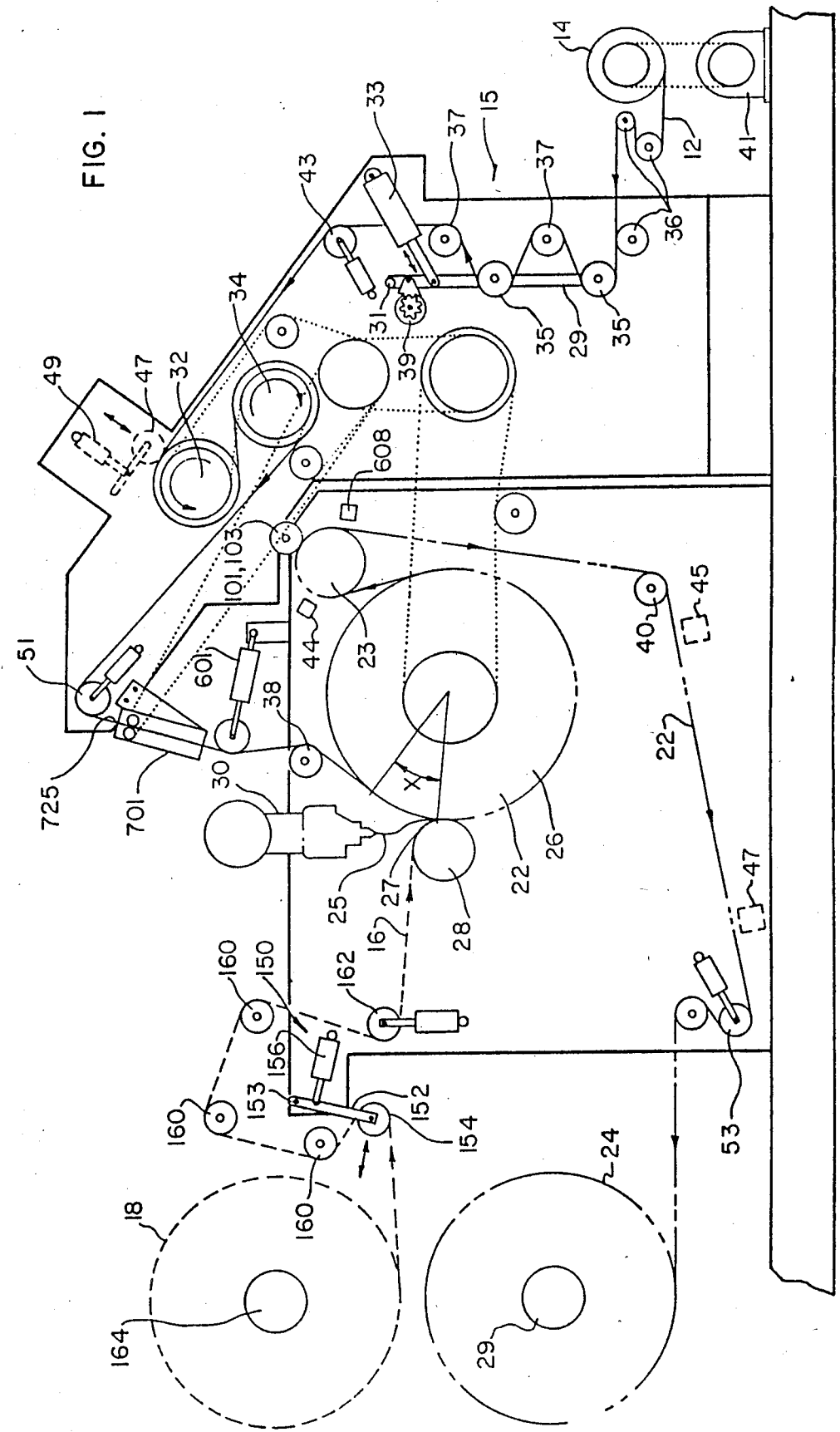

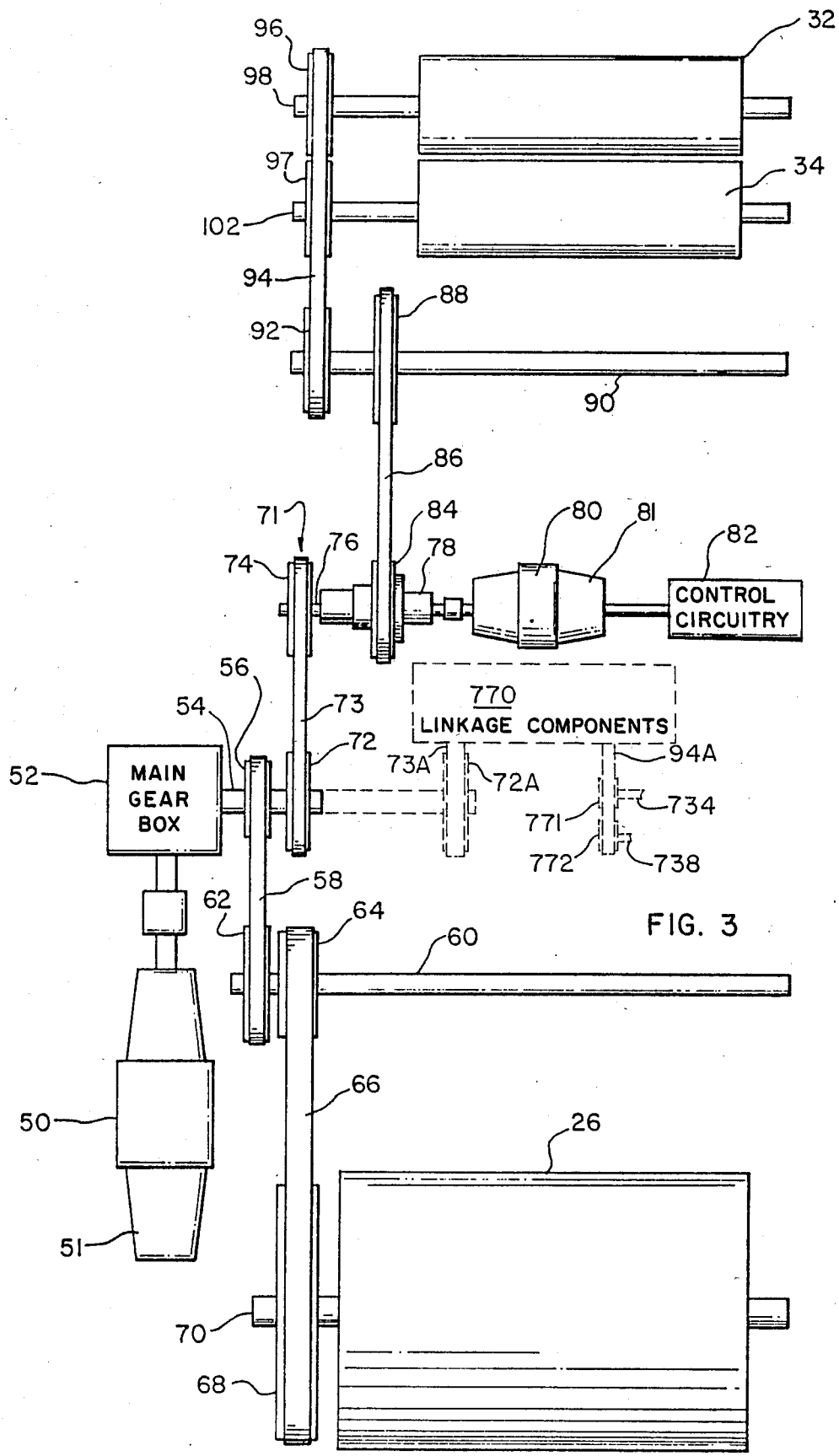

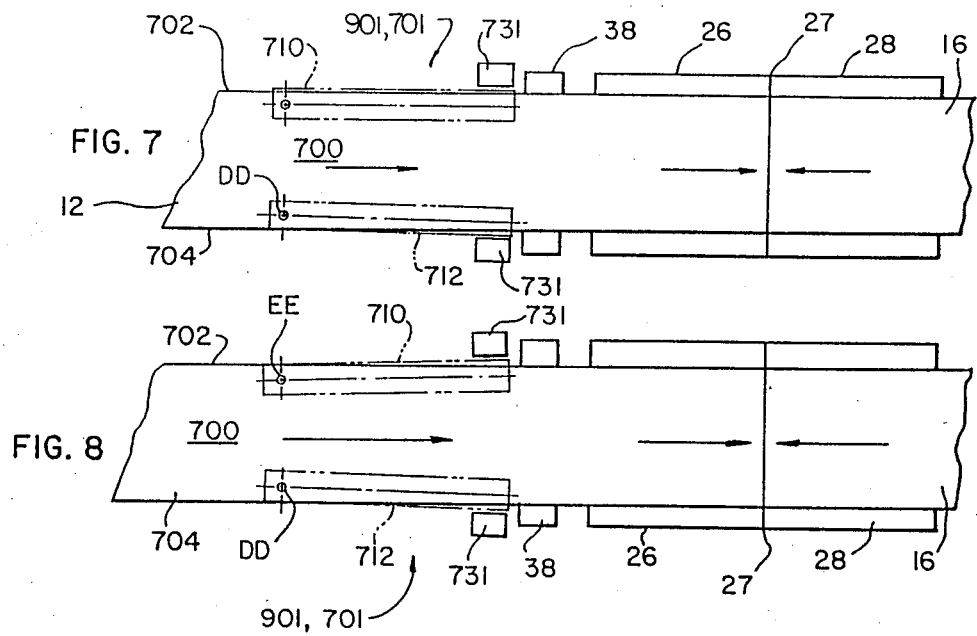
FIG. 7
FIG. 8
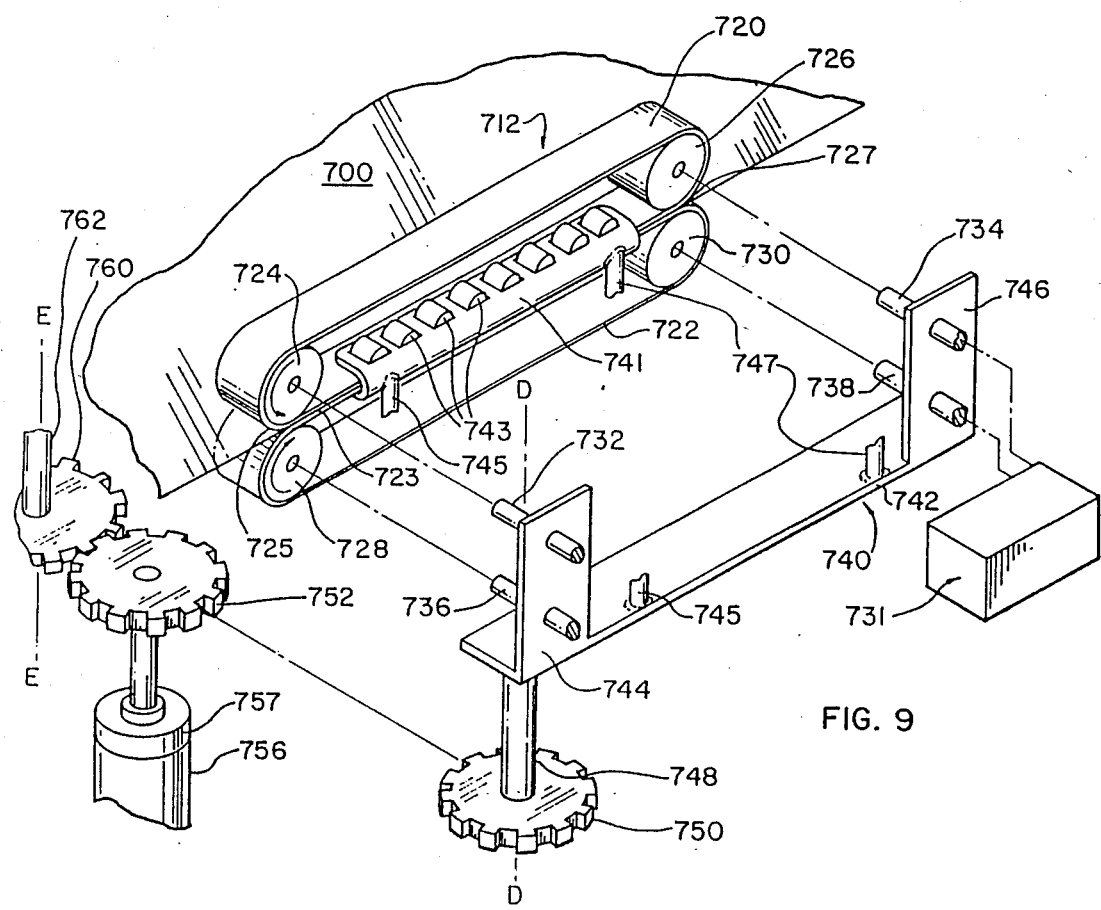
FIG. 9

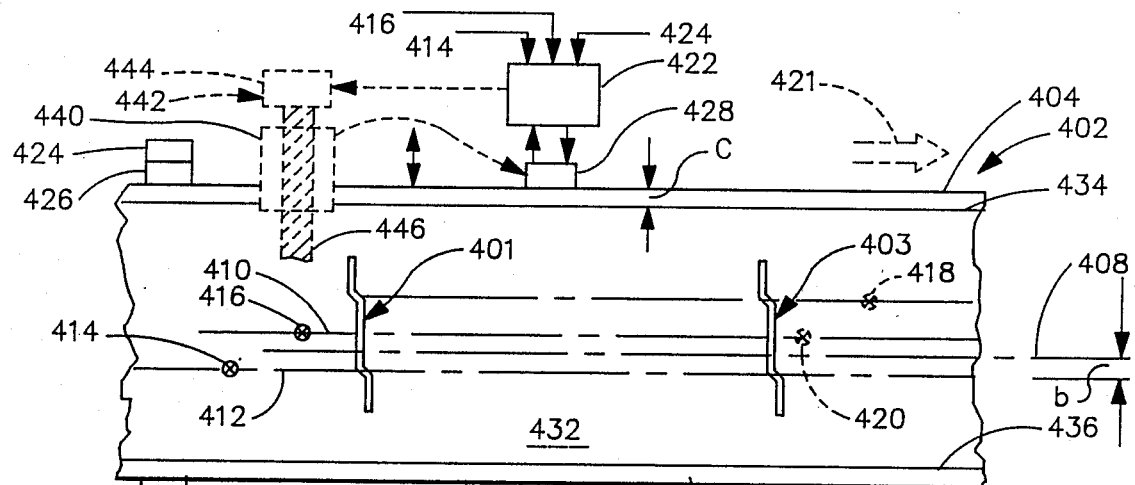
FIG.14
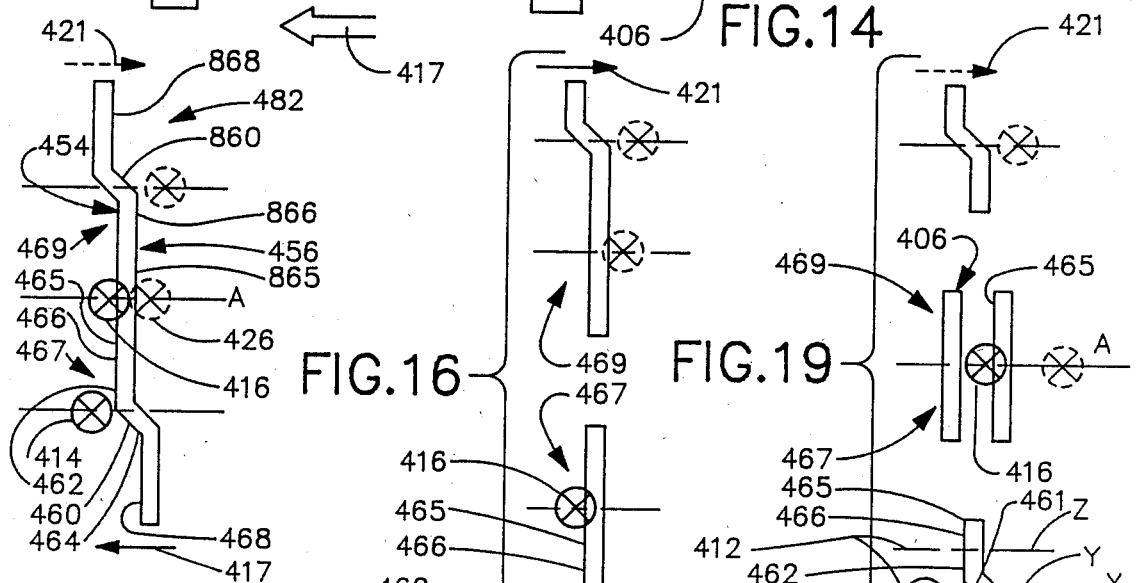
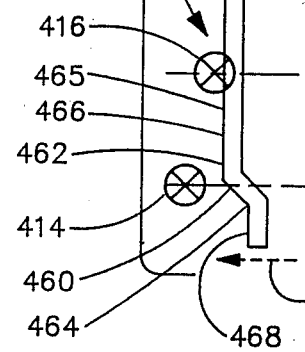
FIG.16
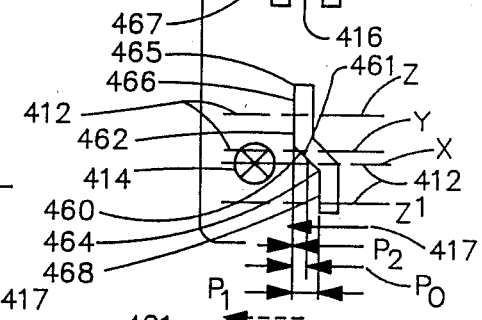
FIG.19
FIG.15
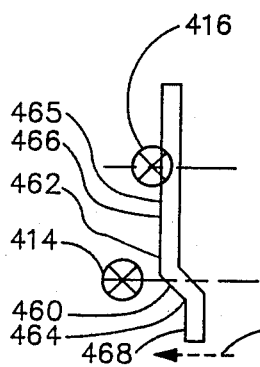
FIG.18
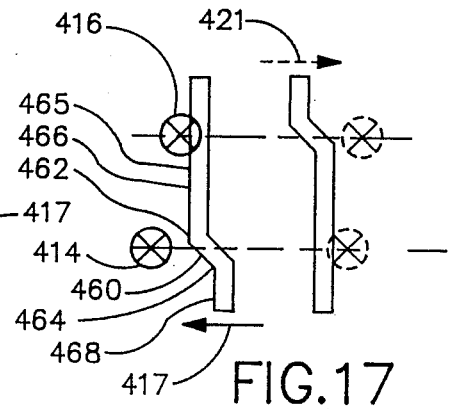
FIG.17
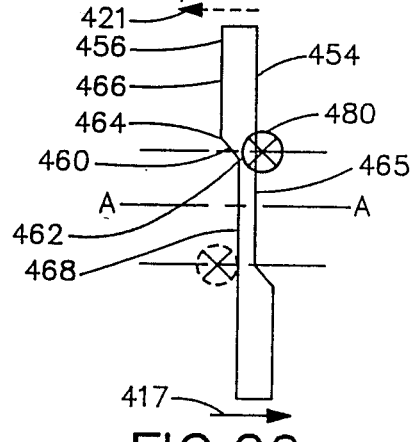
FIG.20

WEB LATERAL POSITION CONTROL APPARATUS AND METHOD

This application is a Continuation-in-Part of U.S. application Ser. No. 667,869 filed Nov. 2, 1984 for METHOD AND DEVICE FOR PROVIDING LONGITUDINAL AND LATERAL STRETCH CONTROL IN LAMINATED WEBS of James Wendell Jensen, now U.S. Pat. No. 4,610,739.

BACKGROUND OF THE INVENTION

The present invention relates generally to the production of laminated paper products and more particularly to a method of lamination and a device for laminating a continuous roll of extensible plastic film material to a continuous roll of paper backing material wherein the device has a system for controlling the amount of distortion in the plastic film material to ensure proper registry of the film material with the paper material.

Lamination of a plastic film material to a paper material has been found to be particularly advantageous where paper products having high strength and abrasion resistant qualities are required. Such laminated composites are particularly desirable in the packaging industry where artwork may be printed on the interior side of the plastic film to produce a high quality display package. The construction and use of such laminated composites are described in Peer U. S. Pat. No. 4,254,173, which is hereby incorporated by reference.

In producing a laminated composite of the type described in Peer, both the plastic film material and the paper material may be provided in continuous sheets, usually referred to as "webs," which are mounted on spools. The paper and the plastic film generally pass over a number of roller type devices where each of the materials is independently stretched under tension and treated in a manner dependent upon the particular end use for the laminated composite. For example, the plastic material may be irradiated in conventional processes to increase its strength or to improve its printability. In preferred embodiments, the plastic is printed with various graphics and provided with a metalized background to enhance the package appearance. The paper as well may undergo treatment such as being electrostatically charged to aid in the bonding process. Either the film material or the paper material or both are treated with suitable adhesive to provide a bond between the paper and the film. To complete the laminating process, the paper and film materials are pressed together between opposed rollers to produce a smooth, flat composite. Various heating or cooling processes may also be required to ensure proper adhesion of the surfaces, depending upon the type of film, paper, and adhesive agent which is being used in the process. The end product of the process is a laminated composite which may be fed directly to a die cutter or to other machines for further processing. The composite may also be taken up directly on a separate spool for storage and later processing.

Use of the film paper composite provides many advantages over conventional packaging material but also creates some unique problems. In order to be cost effective, the plastic material used is generally quite thin—on the order of 0.25-to-2.0 mils. Plastic films of such thicknesses tend to stretch or shrink during the lamination process as a result of variations in temperature and the varying inertial forces exerted on the film as it is unrolled and processed prior to bonding with the paper. Such stretching and shrinking may cause warping or buckling in the laminated composite as the film returns to a steady-state condition. Similarly, a printed image may be repeated on the film for later lamination in registry with predetermined lengths of paper material. In such cases, the printed image length must be held within close tolerance in order to permit proper registry with other processing activities such as automated cutting in a later process step.

Thus, it can be seen that a need exists for a paper-film laminating device which is capable of controlling the amount of stretching distortion in the plastic film material prior to lamination.

Apparatus for controlling the amount of longitudinal stretch in a web of plastic film being laminated to a web of paper board are disclosed in U.S. patent application Ser. No. 441,276 filed Nov. 12, 1982, for CONTROL STRETCH LAMINATING DEVICE of Joseph Robert Haake, Tracy Jay Fowler, and James Wendell Jensen, now U.S. Pat. No. 4,496,417 and U.S. patent application Ser. No. 624,480 filed June 22, 1984, for CONTROL STRETCH LAMINATING DEVICE of James Wendell Jensen and Joseph Robert Haake, now U.S. Pat. No. 4,572,752, both of which are hereby incorporated by reference for all that is contained therein.

It has been found that in some applications it is necessary to accurately control the lateral as well as the longitudinal deformation of a moving film web. Lateral deformation control is especially important when the amount of longitudinal deformation of the film web is relatively large, since longitudinal stretching tends to cause the film web to shrink in its lateral dimension at a rate approximately predictable by Poisson's Ratio for the particular film web material being used.

It would thus be desirable to provide an apparatus capable of controlling lateral as well as longitudinal material in a moving film web.

SUMMARY OF THE INVENTION

The present invention comprises a laminating device and method for applying extensible plastic film material to paper material in a manner which monitors and controls the amount of stretch in the plastic material in both the longitudinal and the lateral directions.

The film material is drawn from a film spool by a drawing nip. In one embodiment of the invention, the drawing nip is formed by two pairs of driven belts. Each pair of belts is constructed and arranged to form a continuous, longitudinally extending nip for engaging one longitudinal edge of the film web. The belt pairs are positioned laterally opposite each other; thus, a portion of the film web passing through the drawing nip formed by these belts has both longitudinally extending edges thereof engaged simultaneously. Longitudinal stretch control is provided by changing the speed of the drawing nip (formed by the two opposite belt nips) with respect to the speed of a laminating nip positioned downstream of the drawing nip. For example, by setting the surface speed of the drawing nip at a speed below the surface speed of the laminating nip, the film web portion positioned between the drawing nip and the laminating nip is stretched a predetermined amount which is dependent upon the difference in surface speed between the drawing nip and the laminating nip.

In this embodiment, lateral stretch may be provided to the film web by deflecting one or both pairs of belts with respect to the longitudinal direction of the film web. For example, one belt pair may be set in a fixed longitudinal orientation; and the second belt pair may be pivoted about an axis coincidental with the point where the film web enters the second belt pair, the pivot axis being perpendicular to the plane of the film web. Thus, the film web may be stretched laterally by an amount equal to the amount of outward deflection at the downstream end of the second belt pair.

In another embodiment of the invention, a separate drawing nip is used to control each of the two stretching functions. For example, a first drawing nip may be provided by a pair of opposed pinch rollers; and a second drawing nip may be formed between the first drawing nip and a laminating nip by two opposite pairs of belt nips as described above. The lateral stretch may then be provided as described above by deflection of one or both belt pairs from a longitudinal orientation with respect to the film web. However, in this embodiment, the surface speed of the drawing nip formed by the two belt pairs is controlled to match the surface speed at the laminating nip. Longitudinal stretch control is provided by varying the surface speed of the first drawing nip formed by the pinch rollers with respect to the surface speed of the second drawing nip formed by the two belt pairs.

Of course, longitudinal stretch control may be provided by controlling the speed of any two adjacent nips with respect to each other; and, thus, speed controlled nips other than the laminating nip or the lateral stretch control nip might also be used for this purpose.

The laminating nip is generally formed by a power-driven main roll and a compression roll positioned in touching or near touching contact therewith. The paper and film are drawn by the laminating rolls while being compressed between them.

As the laminated composite leaves the laminating rolls, monitoring means such as one or more photoelectric assemblies can be provided to detect the passage of preprinted marks on the film. This information is supplied to a data-processing unit which detects any variance between the design (ideal) dimensions and the actually measured dimensions of the film web. The information from the photoelectric assemblies is processed by the data-processing unit in a manner which provides an output command signal to a driving means for the longitudinal stretch-control drawing nip to automatically adjust the surface component of rotational speed of the drawing nip with respect to the surface component of rotational speed of the laminating nip, or a second drawing nip, in order to provide a proper amount of longitudinal stretch to the film. Photoelectric signals related to the lateral dimensions of the film cause the data processing unit to provide control commands to the lateral stretch control nip to deflect one or both of the belt pairs to provide the desired lateral stretch to the film web. Information may be displayed in operator readable form to allow the operator to input certain time response commands relating to the system operation.

The drawing nip(s) and laminating nip may be driven by separate drive units such as individual electric motors which are "slaved together," i.e., phase-locked together by appropriate control circuitry. In another embodiment, a single main drive unit is used for all nips; and a direct-current correction motor (trim motor) and differential drive system are provided for varying the speed of the longitudinal stretch-controlling drawing nip with respect to the speed component provided by the main drive unit.

It is among the objects of the present invention to provide a laminating device for forming a film paper composite wherein the lateral and longitudinal dimensions of the film material are monitored and controlled.

It is a further object of the invention to provide a film paper laminating device wherein the film dimensions are monitored by a photoelectric-sensing system.

It is a further object of the invention to provide a film-paper-laminating device utilizing one or more drawing nips in addition to a laminating nip to control the lateral and longitudinal dimensions of a plastic film web prior to lamination.

It is a further object of the invention to provide a film paper laminating device which utilizes a data-processing means as a component of the control system.

BRIEF DESCRIPTION OF THE DRAWINGS

Various illustrative embodiments of the invention are shown in the accompanying drawing in which:

FIG. 1 is a schematic side elevation view showing the operation of a laminating device of a first embodiment.

FIG. 3 is a schematic plan view showing major elements of a drive train of a laminating device of the type shown in FIGS. 1 and 1A;

FIG. 7 is a plan view of one embodiment of a film web lateral stretch control assembly;

FIG. 8 is a plan view of a second embodiment of a film web lateral stretch control assembly;

FIG. 9 is a partially exploded perspective view of a portion of the lateral stretch control assembly of FIG. 7;

FIG. 14 is a schematic plan view of a web lateral position control apparatus;

FIGS. 15–20 are schematic plan views of various indicia configurations used in the apparatus of FIG. 14;

DETAILED DESCRIPTION OF THE INVENTION

Figure 1A:
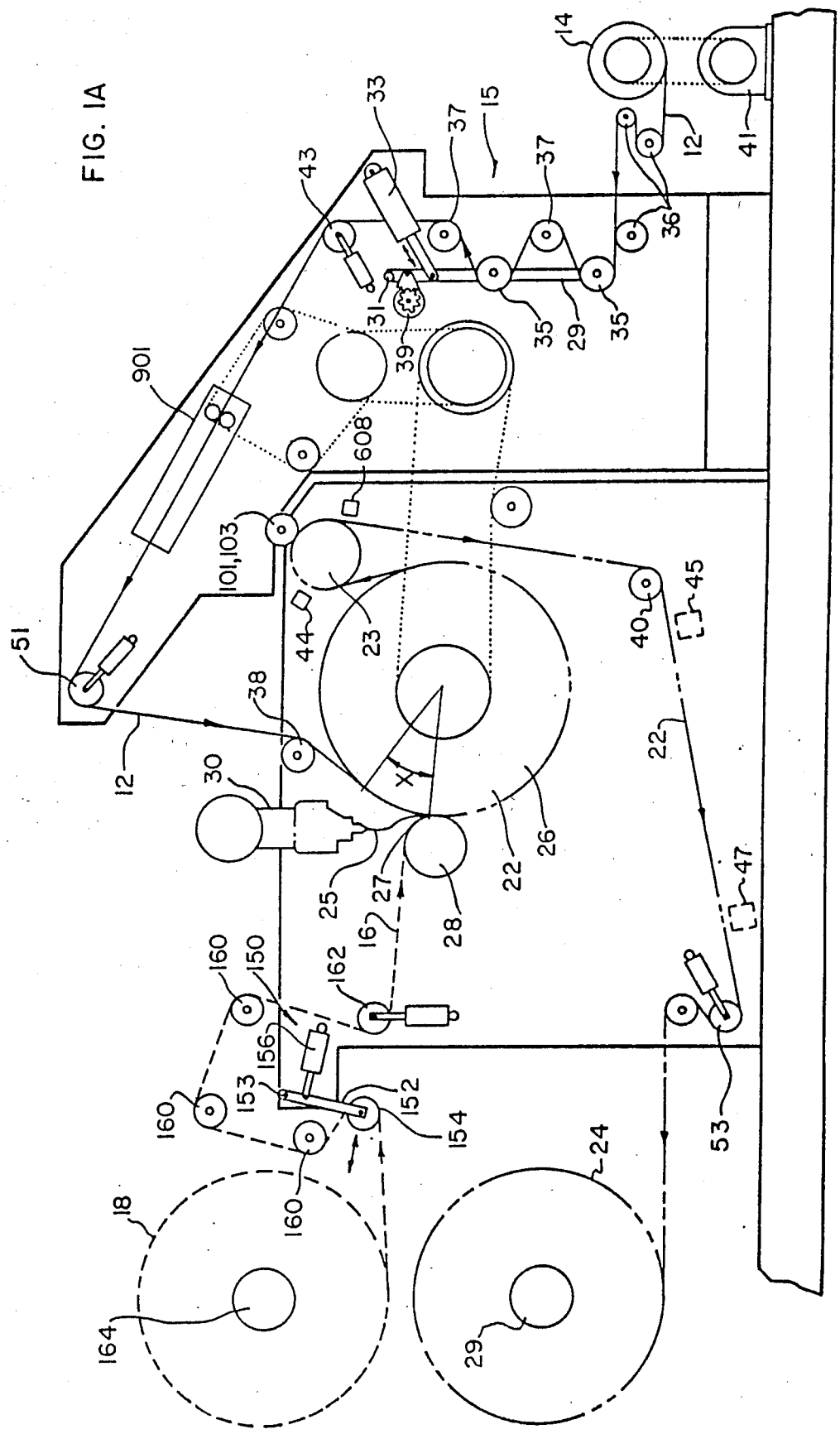
FIG. 1A is a schematic side elevation view showing the operation of a laminating device of a second embodiment.

In general, the laminating device 10 comprises structure and controls for continuously laminating a continuous, relatively extensible film web 12 to a continuous, relatively nonextensible paper web 16 to form a continuous web of laminated composite 22 while continuously monitoring and adjusting both the longitudinal and the lateral dimensions of the film web.

THE LAMINATOR

As illustrated schematically by FIG. 1, the laminating device of the present invention comprises a film supply means such as film spool 14 for supplying a web of extensible plastic film material 12 to be laminated with a web of paper material 16 provided from a paper supply means such as a paper spool 18. A composite collection means such as a composite take up spool 24 is provided for collecting the composite film paper material after lamination. The film upon leaving the film spool 14 may pass through a film unwind dancer assembly 15 which may comprise a dancer arm 29 pivotally mounted at 31 to the machine frame. The dancer arm 29 is also pivotally attached to a pneumatic cylinder unit 33 having a preset internal pressure which is adjustable to accommodate different film web tensions which may be encountered in the use of different types of films or films of different thicknesses or widths. A pair of longitudinally spaced apart, dancer idler rolls 35 is mounted on dancer arm 29; a second pair of idler rolls is mounted at the machine frame in a longitudinally and transversely spaced relationship with the dancer rolls 35. The film web 12 is wrapped back and forth between the two pairs of rolls 35, 37 as shown in FIG. 1. Changes in the film web tension as a result of film speed fluctuation produced either upstream or downstream of the dancer are rapidly dampened out by the pivotal movement of the dancer arm 29 in response to the film speed differential. The constant pressure pneumatic cylinder co-acts with the dancer arm to maintain the film web at a present tension associated with the pneumatic cylinder pressure. A potentiometer unit 39 is actuated by rotational movement of the dancer and generates a control signal which is used to control a film spool motor 41 and a tachometer generator 42 to either increase or decrease the rate at which film web 12 is unwound from the spool. The film web is drawn from the spool 14 by a first drawing nip means such as S-wrap draw rolls 32, 34 as discussed in further detail below. Thus, the dancer assembly provides a means for correcting and maintaining the tension of the film web at a constant tension value in a first film web tension zone between the film spool 14 and the draw rolls 32, 34.

A film web tension monitor such as an idler roll and load cell transducer assembly 43 monitors the tension in the film web 12 in the first tension zone and generates a tension monitoring control signal in response thereto which is input to a computer means 100 for control purposes as explained in further detail hereinafter. The film 12 may pass over a number of cylindrical idler rolls 36 which may be used to straighten and flatten the film 12 as it leaves the spool 14 and which also function to properly align the film material 12 with a first drawing nip means such as S-wrap rolls 32, 34. The first drawing nip means provides the motive force for drawing the film 12 from the film supply means and also cooperates with a second drawing nip means such as assembly 701 in controlling the longitudinal stretch in the film material as described in further detail below. Assembly 701 may provide a drawing nip by utilizing two laterally opposite belt pairs which engage opposite longitudinally extending edges of the film web 12 over a length of several inches. Assembly 701 is described in detail below with reference to FIGS. 7 to 9. The first drawing-nip means may comprise various draw roll configurations such as pinch rolls, also referred to as nip rolls, and other types of draw rolls. In the embodiment illustrated in FIGS. 1 to 4, the first drawing nip means comprise S-wrap rolls 32, 34. (In an alternate embodiment illustrated in phantom lines in FIG. 1, an idler pinch roll 47 having roll contacting force applied thereto by a pneumatic cylinder unit 49 may be used to augment the drawing action of rolls 32, 34 or, in another embodiment, may be substituted for roll 34.) The two equal-radius cylindrical rolls 32, 34 are positioned in parallel axial alignment and rotate in opposite directions at the same speed. The surface of the rolls 32, 34 must be sufficiently smooth to avoid damaging the plastic film web 12 and yet must provide sufficient frictional contact with the film web 12 to prevent slipping between the film and roll surfaces. Thus, the roll surface may be rubber or any number of other appropriate surfaces. The film web is wrapped in an S-shaped configuration over and around the upstream roll 32, then over and around the downstream roll 34 as illustrated in FIG. 1. This so-called "S-wrap" configuration enhances the frictional contact between the film web 12 and rolls 32, 34 providing a nonslipping "nip-effect" relationship wherein the rate of film advance upon leaving the rolls 32, 34 is equal to the tangential speed component at the surface of the rolls 32, 34. After leaving the first drawing nip means, the film web 12 passes over a second tension monitoring means 51 and thereafter passes into a second drawing nip means which, in the preferred embodiment of FIG. 1, also functions as a lateral stretch control means as described in further detail hereinafter. In the embodiment of FIG. 1, a laminating nip means forms a third drawing nip means. The laminating nip means may comprise a laminating nip 27 formed by laminating rolls 26, 28. The film web positioned between the first film drawing nip means and the second film drawing nip means defines a second film tension zone. The film web positioned between the second drawing nip means and the laminating nip means defines a third tension zone. A third tension monitoring means 601 may be provided to monitor the tension in the third tension zone.

In the preferred embodiment of FIG. 1, one or more idler rolls 38 may be used to position the film web 12 at a proper entry angle into the laminating nip 27. The film web 12 and paper web 16 are treated with an adhesive material such as, for example, a melted polymer plastic 25 (such as low-density polyethelene having a melt index of approximately 8 and supplied at a temperature above 615_ F. and preferably 620_ F. to 630_ F.) which is supplied by an adhesive supply source 30 which causes permanent bonding of the paper web 16 and plastic-film web 12 as it passes through the laminating nip 27. The laminating rolls 26, 28 may comprise a main roll 26 which may have a diameter of 24 inches and which may contain cooling (or heating) elements to aid in the production of the adhesive bond between the paper and film. The main roll 26 is driven by a main drive means such as main drive motor 50 illustrated in FIG. 3 and discussed n further detail below. Compression roll 28 may also be driven by the same drive motor 50 or by a conventional "tendency" drive unit (not shown) which overcomes any frictional resistance between the webs and rolls to prevent composite distortion or may alternatively be driven solely by rolling contact with the main roll 26. Compression roll 26, in one embodiment, is also a chill roll and has a rubber outer surface to prevent web slippage which is cooled by a radially, inwardly positioned, roll-cooling structure of a type well known in the art.

The laminating nip 27 formed by laminating rolls 26, 28 draws the film web 12 and paper web 16 therethrough without slippage and simultaneously compresses it to form laminated composite 22. In applications where hot adhesive is applied to the film and paper web at the laminating nip 27, it has been found that the amount of arcuate coverage of the main chill roll 26 by the film web 12 prior to entering the nip may be critical. If the film web enters the laminating nip 27 with very little rolling contact with roll 26, then tension variations in the film web in the third tension zone may cause discontinuous film stretch in the area near the laminating nip which would result in scrap and adversely affect the stretch-control function of the machine. On the other hand, if the arcuate amount of film coverage of roll 26 prior to entry of the film into nip 26 is too great, it has been found that air is drawn into the interface between film web 12 and the roller 26 surface causing discontinuities or "bubbles" to form in the web prior to entering nip 27 which affect the quality of the composite 22 which is formed at the nip 27. When low-density polyethelene film having a melt index of approximately 2 is used with a 24-inch diameter chill roll 26 and where adhesive at a temperature of between 615_ F. and 650_ F. is applied to the laminating nip, it has been found that an angle of arcuate coverage "x" of between 35_ F. and 65_ F. is critical to operation of the laminating device 10.

Again, it should be noted that nonslipping contact between the moving surface of the laminating-nip means and the film web 12 is essential to the operation of the invention. In the preferred embodiment, this nonslipping contact is ensured by the relatively large surface area of the main roll 26 over which the film is wrapped as well as the compressive force exerted by the compression roll 28 at the laminating nip 27. As with the S-wrap rolls 32, 34, the surfaces of the compression roll 28 and main roll 26 must be sufficiently smooth to avoid damaging the film web 12 and paper web 16 and may comprise polished steel in the case of roll 26 and smooth rubber in the case of roll 28.

Nonslipping frictional contact is also provided between the film web and the nip forming surfaces of the second drawing nip means formed by assembly 701 as discussed in further detail below. In the embodiment of FIG. 1, the surface velocity of the second drawing nip means is maintained equal to the surface velocity of the laminating nip means. Thus, the film web tension therebetween, i.e., in the third tension zone, remains substantially constant. It may be seen that the rate of film advance at the point the film leaves the S-wrap rolls 32, 34 and the rate of film advance at the entrance point 725 of the second nip means are directly proportional to the surface velocity of the first drawing nip means and the surface velocity of the second drawing nip means, respectively. By changing the surface velocity of the S-wrap rolls 32, 34 with respect to the surface velocity of assembly 701, a speed differential is created in the film web between the point 40 where the film leaves the S-wrap rolls 32, 34 and the point 725 where it enters the second drawing nip, i.e., in the second film tension zone. By increasing the rotational speed of the S-wrap rolls 32, 34 with respect to the second drawing-nip means so that the tangential velocity component at the surface of the S-wrap rolls 32, 34 exceeds the tangential velocity component at the surface of the second drawing nip means, the film web therebetween is caused to relax in the longitudinal direction. By decreasing the relative speed of the first drawing nip means provided by wrap rolls 32, 34 with respect to the second drawing-nip means, the film is caused to stretch in the longitudinal direction. The amount of longitudinal stretch or relaxation provided to the film in the second tension zone is thus dependent on the difference between the surface speeds of the first and second drawing nip means.

The paper web 16 is drawn from a paper supply spool 18 by the laminating rollers 26, 28. In the embodiment illustrated in FIG. 1, the paper web is passed through a paperweb dancer assembly 150 comprising a dancer arm 152 pivotally attached at 1 53 to a fixed-frame structure and having a single dancer idler roll 154 mounted thereon for receiving the paper web 16 thereabout. The dancer arm 152 is pinned to a constant pressure pneumatic cylinder 156 which functions in the same manner as film dancer cylinder 33 to provide a constant web tension. Upon leaving the dancer assembly, the paper web passes over a series of idler rollers 160 and thereafter around a paper tension monitor 162 which provides a paper web tension indicating signal to the computer 100, or, alternatively, directly to control circuitry for controlling a drag brake 164 to vary the speed of the paper unwind to cooperate with the dancer assembly 150 to maintain the paper web at a constant tension value. Alternatively, the paper dancer assembly 150 could be provided with a potentiometer of the same type used with the film dancer assembly 15 to drag brake 164 to adjust the paper spool angular velocity.

Upon leaving the laminating nip 27, composite 22 may pass over another series of idler rolls 40 and a composite tension monitor 53 and is thereafter received by a collection means such as composite take up roll 24 driven by a take up motor 29 which changes speed in response to a signal generated by tension monitor 53 to maintain a preset tension in the composite web 22. Alternatively, the composite 22 may be further processed as by cutting and folding devices (not shown) to form a final or more completed product.

LENGTH-MONITORING MEANS

Figure 4:
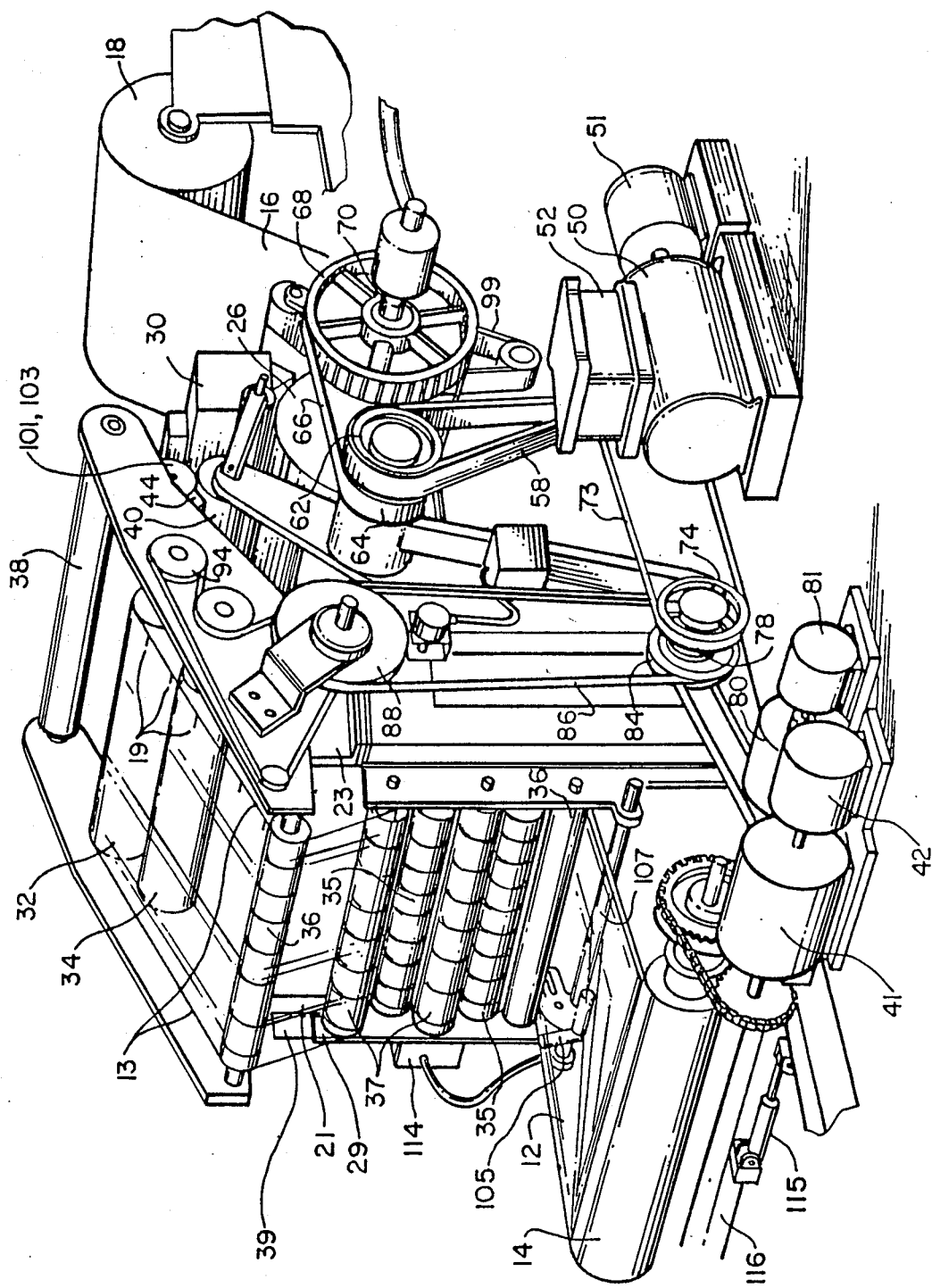
FIG. 4 is a perspective view of a laminating device of the type shown schematically in FIG. 1.

The relative longitudinal stretch in selected portions of the film web 12 subsequent to its lamination with the paper web 16 is measured by a length-monitoring means. In one embodiment, the film web 12 is provided with photoelectrically readable preprinted marks 19 positioned at equally spaced points near one edge of the film 12 as shown by FIG. 4. The distance between these marks 19 will be referred to hereinafter as the "repeat length." As previously mentioned, the laminating device is designed to longitudinally stretch or relax the film 12 in order to laminate predetermined length portions of the film 12 to the paper backing material 16. The distance between the marks 19 in an "ideal" or "design" condition will be referred to as the "design repeat length." However, during operation of the laminating device 10, the film web 12 will stretch and relax; and, thus, the distance between marks may deviate slightly from the design repeat length until the system corrects itself as discussed hereinafter. The actual distance measured between marks 19 by the length monitoring means described hereinafter will be referred to as the "actual repeat length."

The length monitoring means provides data to a data processing means from which the amount of stretch or relaxation in the film may be computed. The data processing means provides a control signal to a first drawing nip means speed control means responsive to the length monitoring means data to selectively vary the speed of the first drawing nip means with respect to the second drawing means for imparting a predetermined amount of stretch or relaxation to the film as it passes between the first and second drawing nip means. The second drawing nip means is speed controlled to match its surface speed to that of the laminating nip means so as to provide a constant tension in the third tension zone between the second drawing nip means and the laminating nip means.

In the illustrative embodiments, the monitoring means comprise photoelectric-sensing means such as photoelectric unit 44 positioned at some point near the path of the composite web 22 downstream from laminating nip 27 for detecting the preprinted, spaced-apart marks 19 on the film 12 edge. The photoelectric unit operates in a conventional manner by sending out an electronic pulse signal in response to a disturbance in a beam of light (not shown) provided by the unit. In this use of the photoelectric unit with the present invention, the disturbance in the light beam is produced by the passage therethrough of a preprinted mark 19. The photoelectric unit 44 might be any of a number of commercially available, high speed units such as MEI Services Inc.'s Scan-A-Matic Model PLM-2000.

Figure 2:
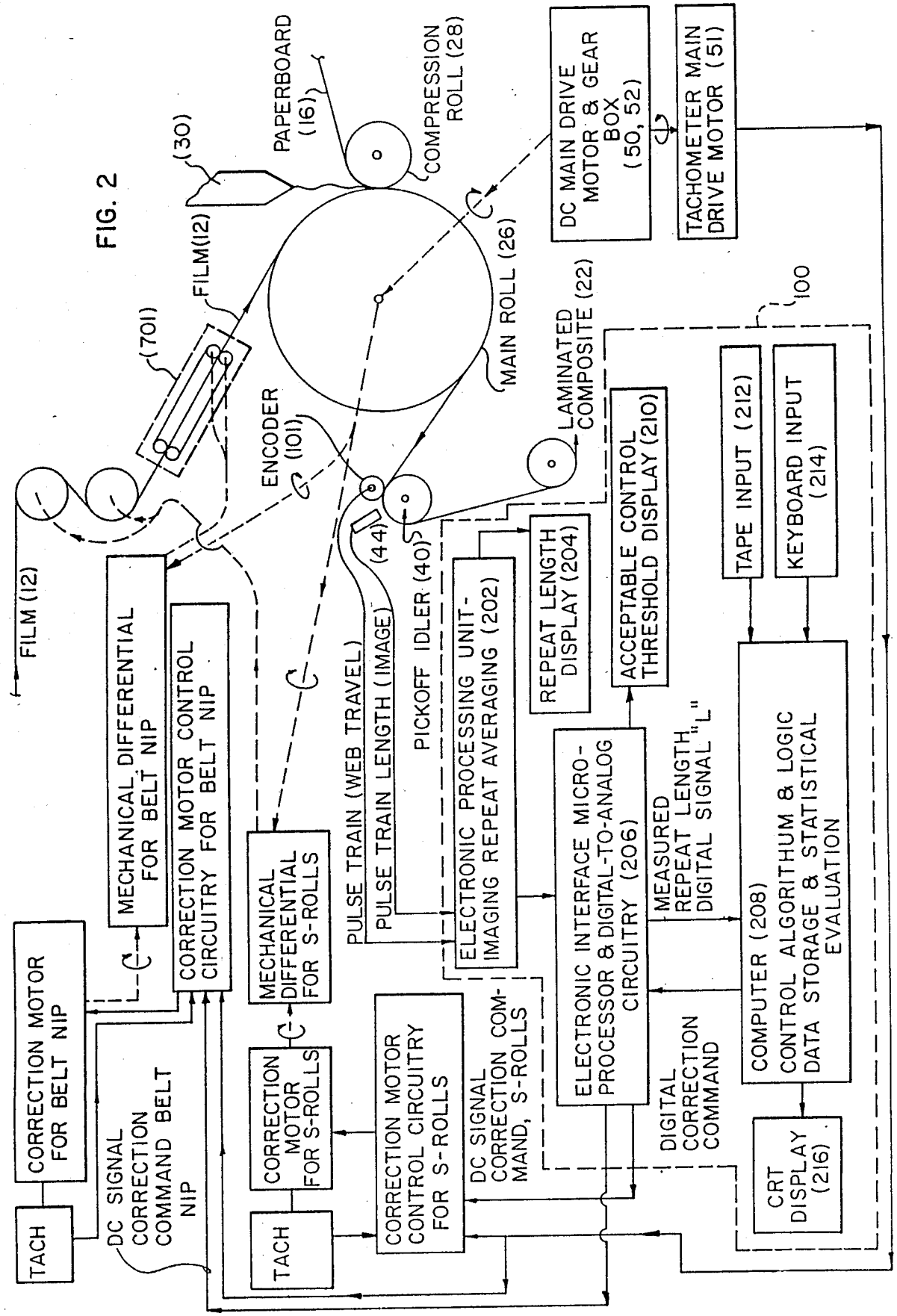
FIG. 2 is a schematic drawing showing the longitudinal stretch monitoring and control functions of the laminating device of the type shown in FIG. 1.

In a preferred embodiment as illustrated schematically by FIG. 2, the photoelectric unit 44 provides a single electronic pulse signal to the data processing means, which may be an electronic data processing unit 100, each time a printed mark is detected. As further illustrated by FIG. 2, a continuous electronic pulse train is also provided as input to the data processing unit 100 by an electronic encoder unit 101. The electronic encoder may be rotatably connected as by a drive belt 99 (FIG. 4) or other conventional means to one of the drive shafts in the main roll 26 drive system or, as illustrated by FIGS. 1 and 4, may comprise a roller portion 103 of a predetermined diameter which contacts and is rotated by the composite web 22. The electronic encoder 101 emits a fixed number of pulses per revolution of the roller portion 103 or the associated drive system shaft typically on the order of 3,000-to-6,000 p.p.r. Thus, the pulse train receives its master speed reference from the main rolldrive system providing a time base for computer operations described below. The rotary pulser may be of a commercially available type such as the Baldwin 5V278 Optical Incremental Encoder.

The data-processing unit 100 is programmed by a conventional circuitry well known in the art to count the number of pulses input from the rotary pulser 101 between consecutive pulses detected by photoelectric unit 44. In slightly different language, the signal from the photoelectric unit initializes a "count window" which is loaded with digital data. The data is loaded into memory at the detection of the next mark, and a new count window is simultaneously initialized for the next data loading.

The digital data from each count window is processed to determine the actual repeat length of the film passing the photoelectric unit 44, and the result is compared by means of conventional comparator circuitry well known in the art to a value representing the design repeat length which is stored in memory. Electronic correction commands are generated based on the deviation between the actual and the design repeat lengths and provided as analog input to correction motor control circuitry 82.

Operator input from a conventional input terminal 102 of a type well known in the art provides processing information such as the design repeat length and the amount of deviation of the actual repeat length from the design repeat length required to initiate correction commands as well as the number of count window repeats required to initiate correction commands.

LONGITUDINAL STRETCH CONTROL

The electronic correction commands provided to the control circuitry 82 actuate a direct-current "trim" or correction motor 80 mechanically linked to a phase-drive unit, FIG. 3. A conventional motor-speed-monitoring means such as a tachometer generator 81 is operably connected to the correction motor drive shaft and outputs a tach signal which is also provided to the correction motor control circuitry 82.

The mechanical output of the phase drive unit 71 is drivingly linked to the S-wrap rolls 32, 34 as discussed in further detail hereinafter; and the rotational speed of the rolls 32, 34 is thus controlled with respect to the main roll 26 rotational speed by mechanical input from the correction motor 80. Since the second drawing nip means is maintained at the same surface speed as the main roll 26, the speed of the S-wrap rolls is also controlled relative to the speed of the second drawing nip means. (The method for maintaining the speed of the second drawing nip means equal to the laminating nip means is discussed in detail hereinafter with reference to FIG. 2.)

Thus, by calculating the actual repeat length of the laminated composite 22 with information supplied by the encoder 101 and photoelectric unit 44 and comparing the result to the design repeat length, the processing unit 100 controls the speed of the S-wrap rolls 32, 34 through appropriate control circuitry and a phase-drive system to control the longitudinal stretch or relaxation of the film 12.

As indicated by phantom lines in FIG. 1, the method of monitoring the film repeat length may be varied slightly by using two photoelectric assemblies 45, 47 positioned at a spaced apart distance equal to the design repeat length of the film. In this embodiment, a count window is initialized by a mark-detection pulse from one photoelectric detector and terminated by a mark detection pulse from the other photoelectric detector. If the actual repeat length is equal to the design repeat length, consecutive, spaced-apart preprinted marks 19 pass the detectors 45, 47 simultaneously leaving no time gap between the pulse signals generated thereby. Thus, no pulse train digital data enter the count window. However, any deviation of the actual repeat length from the design repeat length will cause the marks 19 to pass the detectors 45, 47 at different times producing a time differential between the pulse signals produced by the detectors 45, 47. The time differential between signals allows pulse train data to be loaded into the count window, the number of pulse train pulses in the window indicating the amount of error in length. Thus, in this embodiment, no operator input to the processor 100 is required to indicate the design repeat length; but the photoelectric devices 45, 47 must be physically positioned at a distance equal to the design repeat length or some multiple thereof.

The processing unit 100 may also be provided with a display 110 for displaying various information such as actual repeat length, repeat length error, time response data, etc., depending upon the programming software used.

The mechanical linkage of the laminating device is illustrated in FIG. 3. A main drive means such as main drive motor 50 with tachometer generator unit 51 is operably connected to a main gear box 52 which, in turn, drives main drive shaft 54. Main drive shaft pulley 56 mounted on shaft 54 is connected by means of drive belt 58 to a secondary drive shaft pulley 62 coaxially mounted on secondary drive shaft 60 with pulley 64. Pulley 64 is operably connected to main roll pulley 68 by another belt 66 whereby the main roll 26 is rotated about main roll drive shaft 70. S-wrap rolls 32, 34 are mechanically linked to phase drive unit 71 and main drive motor 50 as by main drive-shaft parasite pulley 72 operably connected by belt 73 to phase drive pulley 74, in turn, mounted on phase-drive shaft 76. Phase drive shaft 76 is operably connected by conventional means well known in the art to a differential unit 78 such as, for example, a Conac 25 Differential Unit having a phase drive correction pulley 84. Phase drive correction pulley 84 is operably connected by means of a drive belt 86 to conversion pulley 88 mounted on conversion drive shaft 90 upon which S-wrap connector pulley 92 is coaxially mounted. S-wrap roll belt 94 is operably connected to upper S-wrap roll pulley 96 and lower S-wrap roll pulley 100 in an S-wrap configuration (FIG. 4) whereby first and second S-wrap shafts 98, 102 and, consequently, S-wrap rolls 32, 34 are rotated in opposite directions at the same speed.

Mechanical input to differential unit 78 is provided by correction motor 80 for the purpose of increasing or decreasing the rotation speed of phase drive correction pulley 84. The correction motor rotational input is added to or subtracted from the speed of shaft 76 by an internal differential gearing mechanism (not shown) of a type well known in the mechanical arts. Correction motor 80 is actuated and controlled by correction motor control circuitry unit 82 which, in turn, receives commands from processing unit 100 as discussed in further detail herein.

As illustrated in phantom line in FIG. 3, a drive linkage beginning with pulley 72A mounted on shaft 54 and ending with belt 94A wrapped in an S-wrap configuration about pulleys 771 and 772 may be provided to drive shafts 734, 738 of assembly 701. See also FIGS. 7 to 9. The linkage components, designated schematically as 770, between 72A and 94A, may be identical to those linkage components between 72 and 92 discussed above. This linkage assembly may be used to maintain the surface speed of the second drawing nip means equal to the speed of the laminating nip means.

The control components of the longitudinal stretch control system will now be described in further detail with reference to FIG. 2.

The longitudinal stretch control system components of he embodiment of FIG. 1 are illustrated schematically in FIG. 2. The web speed indicating pulse train from encoder 101 and the film mark sensing pulse train from photoelectric unit 44 are supplied to an electronic processing unit 202 which computes and averages repeat lengths from information provided by the two pulse trains. The repeat length may be displayed on a conventional CRT unit or LED digital display at 204. The averaged repeat length values from unit 202 are also provided to electronic microprocessor and digital to analog circuitry (206) which transmits digital data corresponding to the measured repeat length to a microcomputer 208. The electronic interface circuitry also provides a signal to an LED display which provides an acceptable control threshold display 210. The microcomputer 208 which contains the control algorithm and logic and which provides data storage and statistical evaluation of the system receives its operating instructions by conventional input devices such as tape input unit 212 and keyboard input unit 214. A CRT display 216 for displaying various system information and for presenting information requests to the operator is provided. The computer 208 processes the digital repeat length data from interface circuitry 206 and outputs a digital-correction command to the interface circuitry which converts the digital command to an analog voltage command which is provided to the correction motor control circuitry 82. A main drive reference speed signal is provided from the main drive motor tachometer unit 51 to the S-wrap correction motor control circuitry 82, and a feedback reference speed signal from the S-wrap correction motor 80 is also provided to the S-wrap correction motor control circuitry. The S-wrap correction motor control circuitry processes these reference signals and correction signal and provides an appropriate signal to the S-wrap correction motor to increase, decrease or maintain its present speed as may be required. As explained above, the correction motor mechanical output to mechanical differential unit 71 adjusts the speed of the S-wrap rolls 32, 34 to stretch or relax the film web 12 passing through the second tension zone.

As further illustrated by FIG. 2, the surface speed of the second drawing nip means provided by assembly 701 is speed controlled to match the surface speed of the laminating nip means. In the control scheme illustrated in FIG. 2, the second laminating nip means is provided with a mechanical linkage identical to that of the first drawing nip means as discussed with reference to FIG. 3. A main drive reference speed signal is provided from the main drive motor tachometer unit 51 to the belt nip correction motor control circuitry. A feedback reference speed signal from the belt nip correction motor tach is also provided to the belt nip correction motor control circuitry. The belt nip correction motor control circuitry processes these reference signals and correction signal and provides an appropriate signal to the belt nip correction motor to increase, decrease or maintain its present speed as required to match the speed of the laminating nip 27.

Another embodiment of the invention is illustrated in FIG. 1A. In this embodiment, the drawing nip provided by S-wrap rolls 32, 34 is replaced by a first drawing nip formed by an assembly 901 having two belt pairs positioned to engage opposite, longitudinally extending edges of the film web 12. The assembly 901 may be identical to the assemblies illustrated in FIGS. 7 to 9 and discussed in further detail hereinafter. In this embodiment, the first drawing nip is again speed controlled relative to a second drawing nip to control the longitudinal stretch in the film web 12. However, in this embodiment, the laminating nip 27 comprises the second drawing nip means rather than an intermediate drawing nip. Except for the replacement of the S-wrap nip and the nip of assembly 701 of FIG. 1 with a single drawing nip formed by assembly 901, FIG. 1A is the same as FIG. 1. A first, relatively constant tension zone is thus provided between film unwind spool 14 and the film entrance to assembly 901. A second variable tension zone is provided between the exit of assembly 901 and the laminating nip 27. The film web may be stretched or shrunk in the second tension zone by decreasing or increasing the surface speed of a first drawing nip means formed by assembly 901 with respect to the surface speed of a second drawing nip means formed by laminating rolls 26 and 28.

Figure 2A:
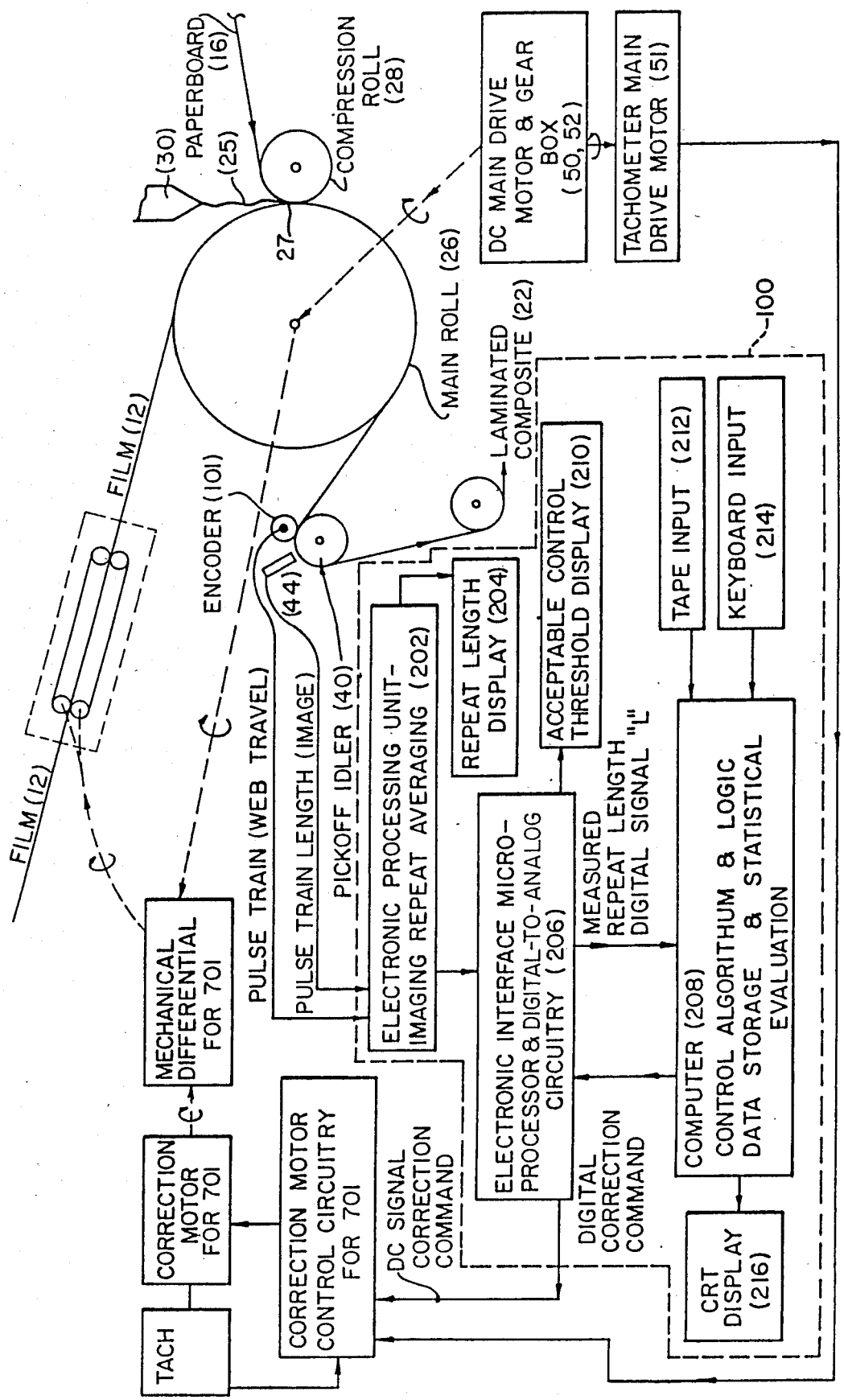
FIG. 2A is a schematic drawing showing the longitudinal stretch monitoring and control functions of the laminating device of the type shown in FIG. 1A.

The method and apparatus for controlling the nip surface speed of assembly 901 with respect to the laminating nip surface speed may be essentially identical to the apparatus and method used for controlling the speed of the S-wrap rolls described above with reference to FIGS. 1 and 2. Thus, a mechanical linkage identical to that described with reference to FIG. 3 may be employed to drive the nip of assembly 901. As illustrated by FIG. 2A, this mechanical linkage may be incorporated into a control system in the same manner as described for controlling the speed of the S-wrap rolls in FIG. 2.

In general illustrated by FIG. 7 and 8, the lateral stretch control apparatus of the present invention comprises film web lateral stretch control means such as a lateral stretch assembly 701, 901 which receives the film web 12 at a position just upstream of the laminating nip 27. In the embodiment shown in FIG. 1 stretch assembly 701 is used in cooperation with S-wrap rolls 32, 34 to provide longitudinal stretch control in addition to its primary function of lateral stretch control. In the embodiment of FIG. 1A assembly 901 is used in cooperation with the laminating nip 27 to provide longitudinal stretch control as well as its primary function of lateral stretch control. The following discussion deals exclusively with the lateral stretch control function of the assembly represented as 701 in FIG. 1 and 901 in FIG. 1A and shown in detail in FIGS. 7-9. For brevity the single reference numeral 701 will be employed throughout the remainder of the application when referring to this assembly.

The lateral stretch control apparatus also comprises a film width monitoring means which may include a photoelectric mark detection assembly 606, 608 positioned downstream of the laminating nip 27. In the embodiment illustrated in FIG. 1, a portion of the film width monitoring means, photoelectric unit 608, is shown positioned proximate take off roll 23. The film width monitoring means may also include a web speed sensing means such as electronic encoder unit 101, discussed above, for generating a machine speed based signal, which is processed with the signal from the mark detection assembly 606, 608 to determine film width as discussed in further detail below.

Figure 5:
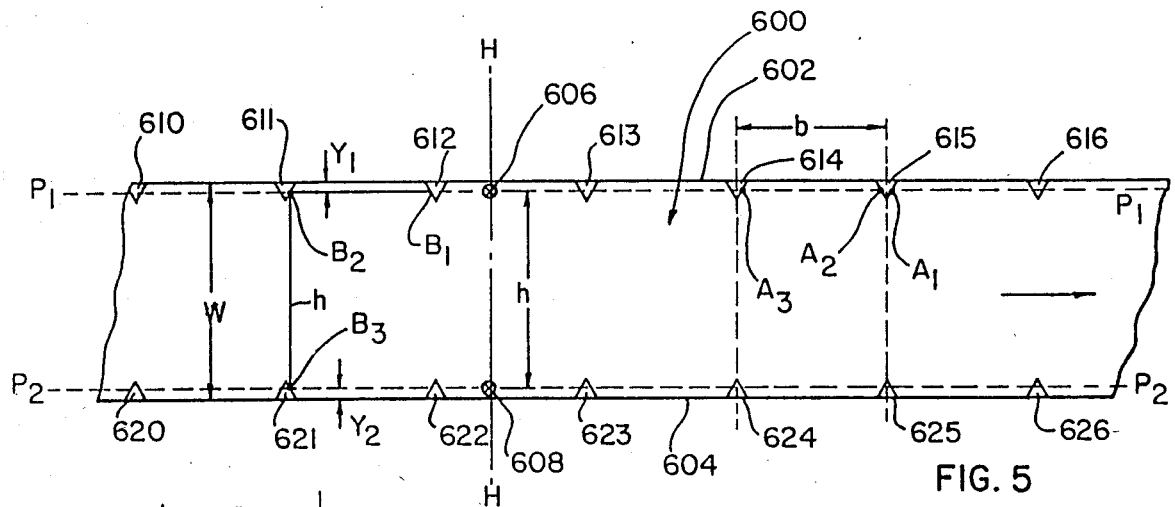
FIGS. 5 and 12 are plan views showing a film web with printed indicia thereon and photoelectric indicia sensors.
Figure 6:
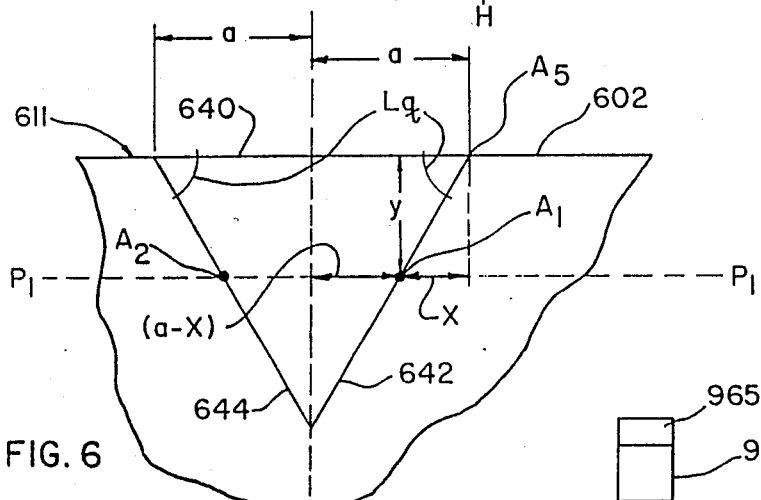
FIG. 6 is a detail view of one of the indicia of FIG. 5.
Figure 12:
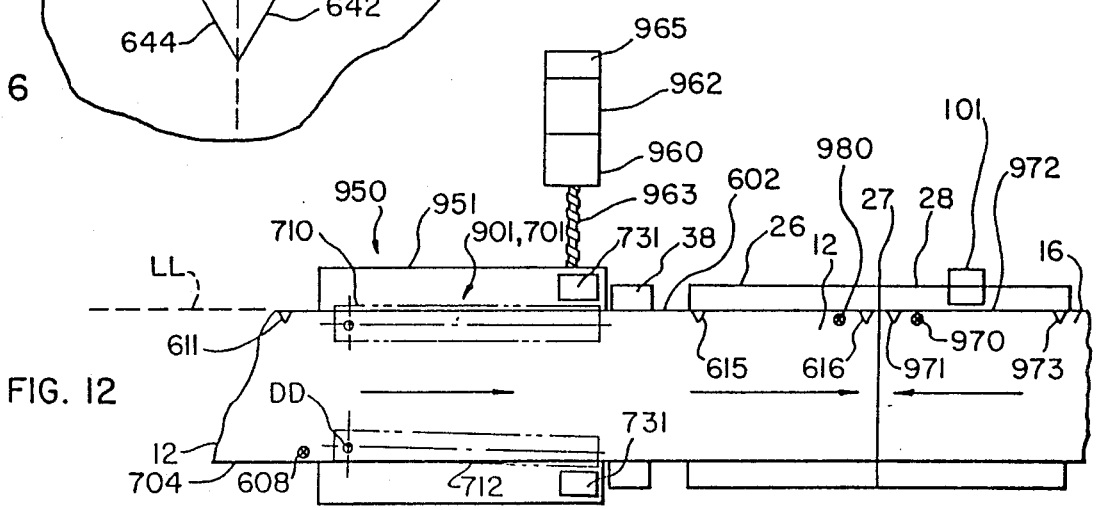

The method of monitoring the width of the film web 12 will now be described with reference to FIGS. 5 and 6. As illustrated in FIG. 5, a portion of the film web 600 having lateral edges 602, 604 passes immediately below a pair of laterally spaced apart photoelectric units 606, 608 which comprise a photoelectric means for sensing the passage of spaced apart indicia means on the film web. In the embodiment illustrated in FIG. 5, the spaced apart indicia means comprise a first series of substantially equally spaced apart marks 610–616, etc. and a second series of substantially equally spaced apart marks 620–626, etc. positioned in mirror image relationship to the first series of marks. In one preferred embodiment which is the best mode presently contemplated, the marks comprise a triangular configuration having a base portion 640, FIG. 6, coincident with an associated edge portion 602, 604 of the film web and having a leading edge 642 positioned downstream (with reference to the direction of film travel in FIG. 5) of a trailing edge 644 which forms the third side of the triangular mark. In the embodiment illustrated in FIGS. 2 and 3 each triangle comprises an identical isosceles triangle, however, other triangular, and/or geometric configurations having a leading edge and a spaced apart trailing edge, at least one of which is nonparallel and nonperpendicular to the web edges 602, 604, may be used With equal effectiveness as will become obvious to one of ordinary skill in the art after reading this specification.

The photoelectric units 606, 608 are used to detect the points in time at which both a leading edge portion and a trailing edge portion of each mark pass immediately below it (i.e., on path $P_1$ or $P_2$, respectively). By comparing this set of signals to a web speed based signal, it is possible to determine the distance between a point $A_1$ on the leading edge of a mark, e.g., 615, and a point $A_2$ on the trailing edge of that mark which falls within the scan path, e.g., $P_1$ of the associated photoelectric unit, e.g. 606. Alternately, the measurement could be taken between a point $B_1$ on the trailing edge of one mark, e.g. 612, and a point $B_2$ on the leading edge $B_2$ of the next succeeding mark 611. From either set of information it is possible, as described in further detail below, to calculate the relative position of a photoelectric unit, e.g. 606 from an associated lateral edge, e.g. 602 of the film web 600. When the respective distance of each photoelectric unit 606, 608 from an associated lateral edge of the film web 602, 604 is known, the width "w" of the film web may be calculated by adding the preset lateral distance "h" between the two photoelectric units 606, 608 to the respective lateral distance "y" of each photoelectric unit from its associated edge of the film web, i.e. the distance between path $P_1$ or $P_2$ and the associated film edge 602, 604.

Having thus described the operation of the film width monitoring means in general, the operation will now be described in detail. The construction and arrangement of the invention is such that the film web at portion 600 passes below the two photoelectric units 606, 608 in substantially perpendicular relationship to a straight line HH extending between the two photoelectric units. For purposes of reference, the unknown width of the film web is indicated as "w" and the known lateral distance (measured perpendicular to the path of the web) between the two photoelectric units 606, 608 is indicated as "h". The paths along the film web portion 600 positioned immediately below a photoelectric units 606, 608 is indicated in FIGS. 5 as $P_1P_1$ and $P_2P_2$, respectively. The distance between any two identical points on two succeeding marks, e.g. 614, 615 (e.g., the distance between mark centerlines) is indicated as "b". It may be seen that the value "b" may be obtained by measuring the distance between two succeeding points, e.g. $A_1$ and $A_3$ lying on leading edges of two succeeding marks, e.g. 614 and 615 and falling within an associated scan path, e.g. $P_1P_1$. (Thus this width monitoring apparatus may also be used to measure longitudinal spacing between preprinted marks and might be used instead of the longitudinal stretch monitoring assembly discussed above when both longitudinal and lateral dimensions are to be monitored.) It may also be seen that the lateral distance between two points, e.g. $B_2$, $B_3$ on laterally opposite pairs of marks which are coincident with the two paths $P_1P_1$, $P_2P_2$ is equal to the lateral distance between the two photoelectric units 606, 608. Referring now to FIG.

6, the acute angle which the leading edge 642 and trailing edge 644 make with the base of the triangle 640 is indicated as "q". Half the length of the base 640 (a known value) is indicated as "a". The longitudinal distance between a point $A_5$ at the forward most portion of the base and a point $A_1$ along path $P_1P_1$ and coincident with the leading edge 642 is indicated as "x". The longitudinal distance between point $A_1$ and the longitudinal center of the triangle is therefore equal to $(a-x)$. The lateral distance between point $A_1$ and the base 640 of the triangle is indicated as "y".

The distance between $A_1$ and $A_2$, which may be seen to equal $2(a-x)$, may be calculated by the central processing unit 100 by comparing the time base signals generated by photoelectric units 606 with the web speed base signal generated by the encoder unit 101. Let this calculated distance value equal "k". Thus $2(a-x)=k$. Solving this expression for the value x, we have $x=(2a-k)/2$. As a matter of elementary trigonometry, the values "y" and "x" are related by the expression $\tan(q)=y/x$ or $y=x \tan(q)$. Thus $y=(2a-k) \tan(q)/2$. Since the values of "a", "k", and "q" are known, the value of "y" can be calculated by the computer. Although the above discussion relates to the calculation of the distance "y" from the path $P_1P_1$ from web edge 611, exactly the same method may be used for calculating the distance of path $P_2P_2$ from lateral edge 604. The value "w" is thus equal to $h+y_1+y_2$ where $y_1$ is the distance of unit 606 from web edge 602 and $y_2$ is the distance of unit 608 from edge 604.

It should be noted that a small amount of lateral shifting of the film web in the direction of one of the photoelectric units 606 or 608 will not effect the accuracy of this calculation so long as the lateral shifting is not sufficiently large to take one of the series of film marks entirely out of an associated path $P_1P_1$ or $P_2P_2$.

The film web lateral stretch control means will now be described with reference to FIGS. 7-10. As illustrated by FIG. 7 and 8, the film web lateral stretch control means may comprise a pair of longitudinally extending guide means 710, 712 which frictionally engage opposite portions of the moving film web 12 proximate the film web lateral edges 702, 704 along a length of the film web designated as 700. In the embodiment illustrated in FIG. 7 longitudinally extending guide means 712 is pivotable about axis DD positioned perpendicular to the plane of the film web and guide 710 is fixed. In the embodiment illustrated in FIG. 8, both guide 710 and guide 712 are pivotable about axes EE and DD, respectively, both axes being positioned perpendicular to the plane of the film web portion 700.

The construction of guide means 712, which may be identical to that of guide means 714, is illustrated in further detail in FIG. 9. It may be seen that guide means 712 comprises a pair of oppositely positioned endless belts 720, 722, each belt being mounted on a pair of rollers 724, 726, and 728, 730, respectively. The two belts 720, 722 rotate in opposite directions and are positioned in close parallel relationship to form a nip area 723 extending from a film web entrance position 725, where the film web is initially engaged, to a film web exit position 727, where the film web is disengaged from the belt nip. The two belts 20, 722 may be driven by conventional driving apparatus well known in the art, such as separate electric motor unit 731 or alternately by mechanical linkage to the main drive motor as described above with reference to FIG. 3. The portion of the film web positioned between the two belts is engaged by the belt nip 723 in secure, nonslipping contact. It may be seen from FIG. 9 that the belt drive rolls, 724, 726, 728, 730 are mounted on associated parallel shafts 732, 734, 736, 738 which are in turn mounted on a bracket assembly 740 comprising a longitudinally extending connection portion 742 and two transversely extending branch portions 744, 746. The shafts 732, 734, 736, 738 may extend through the associated branch portions 744, 746 in journalled relationship therewith to be conventionally connected such as by gears (not shown) to associated drive means such as motor 731. Bracket assembly 740 has a pivot shaft 748 fixedly attached thereto at a position thereon immediately below the film web nip entry portion 725. The shaft 748 enables bracket 740 to be pivoted about axis DD. Shaft 748 may be pivoted as by a geared linkage 750, 752 connecting it to a pivotal movement means such as electric control motor 756 having an associated angular displacement sensor 757. In the embodiment illustrated in FIG. 8 and 9 a second geared linkage 752, 760 is provided to a shaft 762 oriented coaxially with pivot axis EE for pivoting guide means 710 which is operably attached thereto in the same manner as shaft 748 and guide means 712.

Referring again to FIG. 9, it will be seen that a belt sheath 741 is provided which has opposite rows (only one shown) of roller bearings 743 for urging the two belts 720, 722 into tight web engaging contact. The roller bearing are conventionally journalled to the longitudinally extending, U-shaped sheath 741. The sheath may be supported on bracket 740 as by welded support members 745, 747.

Figure 10:
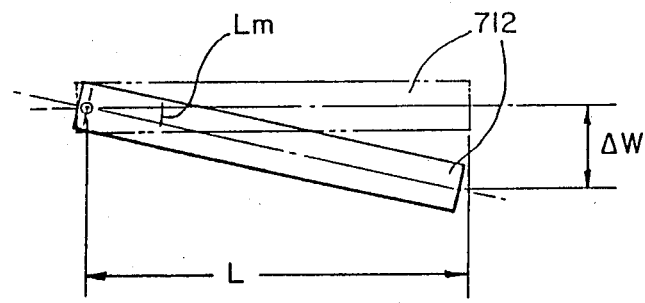
FIG. 10 is a detail plan view of one guide means of a lateral stretch control assembly of the type illustrated in FIGS. 7 and 8.

Referring to FIG. 10, it may be seen that in order to laterally stretch the film, one (or both) of the guide means 710, 712 may be deflected such that the downstream end thereof is positioned outwardly of a parallel alignment with the film web direction of travel. In the arrangement of FIG. 7, the entire width increase "w" would be provided by pivotal movement ob guide means 712 alone. The angle of deflection "m" of the guide means 712 from a straight ahead position being related to the increase in width "w" by the relationship, $\tan m = w/L$, where "L" is the length from entry nip portion 725 to exit nip 727. Of course, when both longitudinal guide means 710, 712 are deflected, as in the arrangement of FIG. 5, then the amount of deflection of each is equal to one half of the total amount of deflection "w" necessary to provide the desired amount of stretch to the film web.

Figure 11:
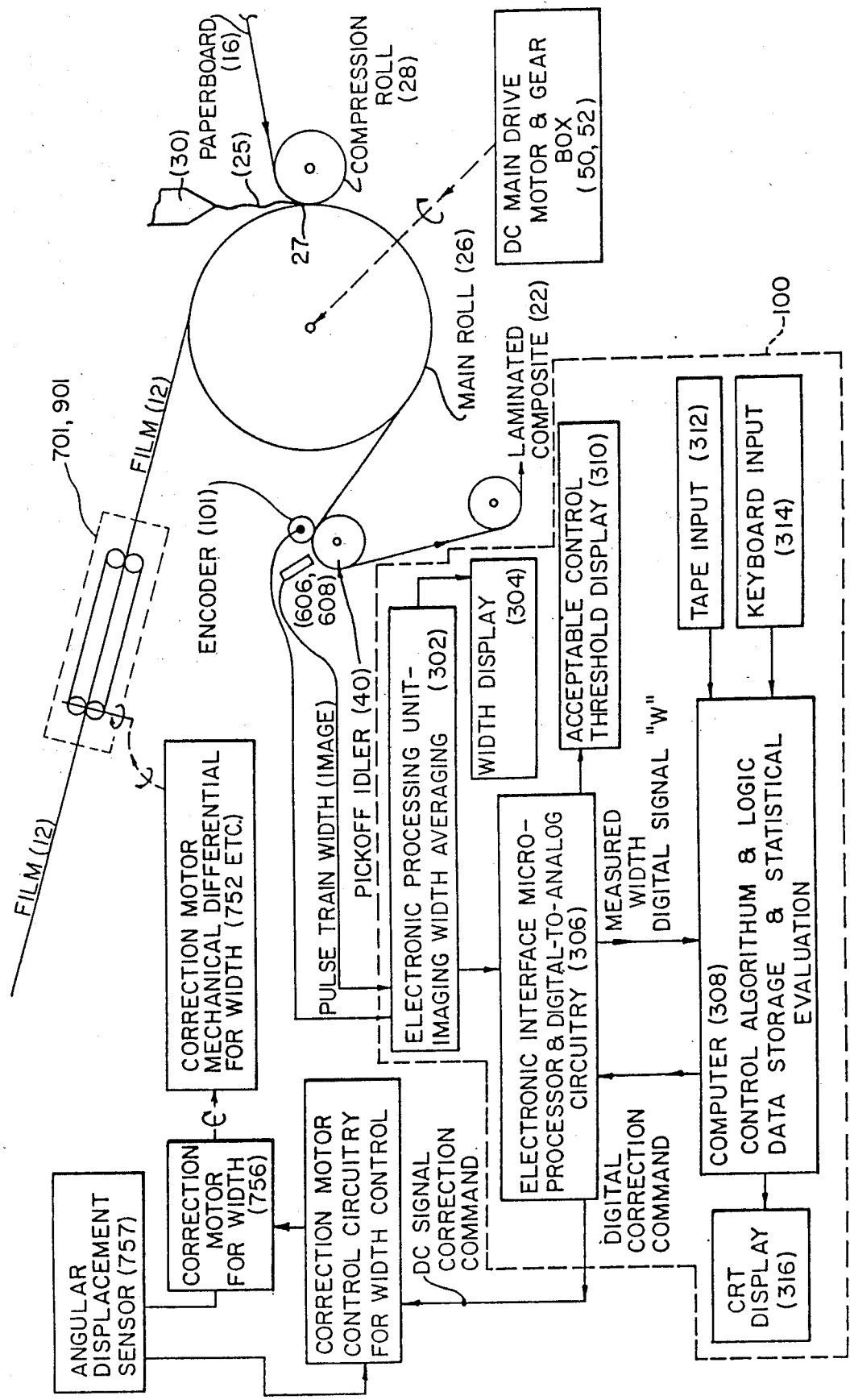
FIGS. 11 and 13 are schematic drawings showing the lateral-stretch monitoring and control functions of a laminating device of the type shown in FIGS. 1 or 1A.
Figure 13:
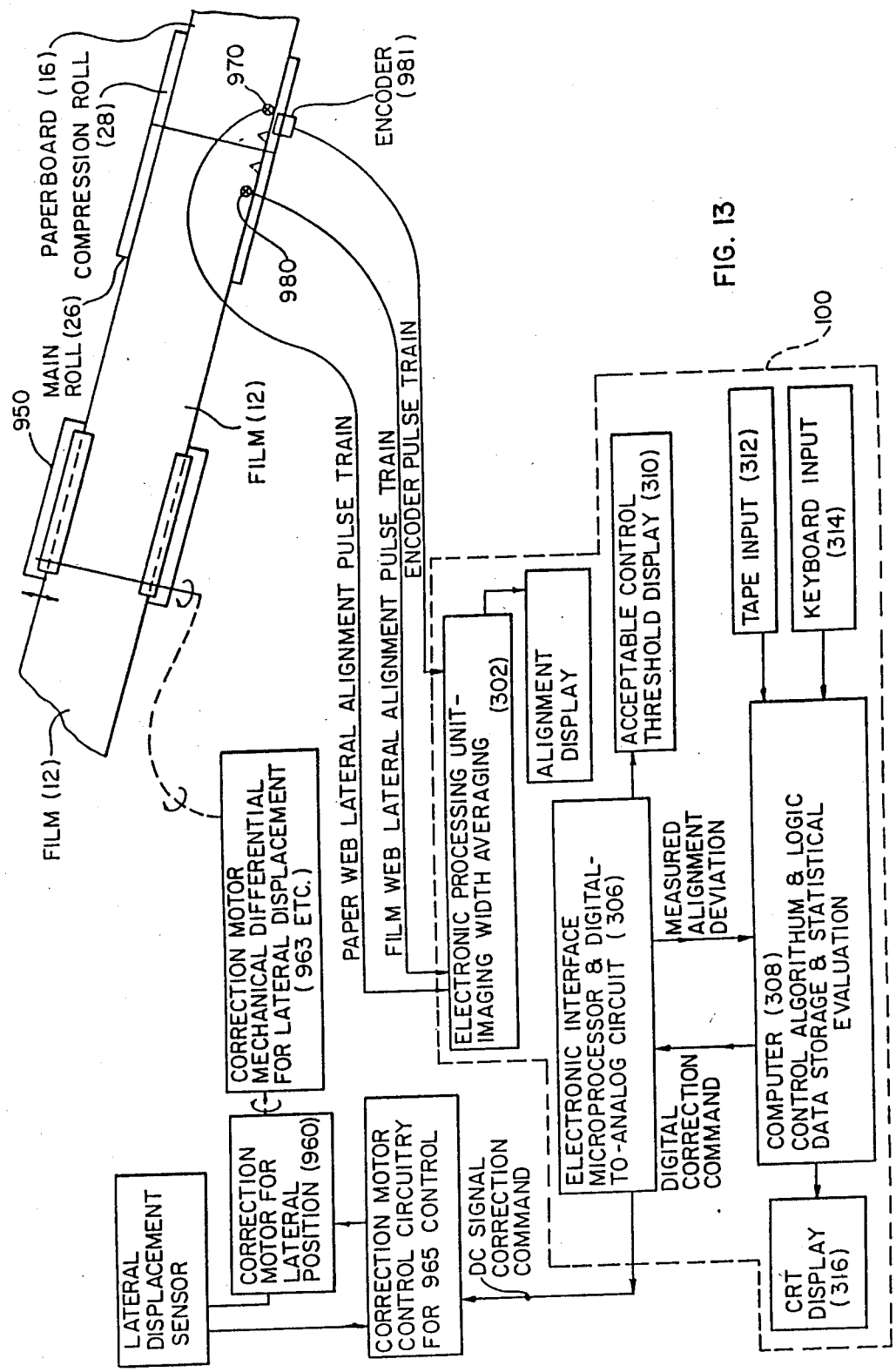

The monitoring and control system for lateral stretch control of the film web 12 is illustrated schematically in FIG. 11. An electric pulse signal corresponding to sensed leading or trailing indicia edges is provided by photoelectric sensors 606, 608 and a web speed dependent electronic pulse signal is provided by encoder unit 101. These two signals are processed by an electronic processing unit 302 to determine the width of the film web at the position of the photoelectric sensors 606, 608. This measured width value may be displayed in operator readable form by display unit 310. A digital signal indicative of the measured width is provided from processing unit 302 to electronic interface and digital analog circuitry unit 306 and control algorithm computer 308 which compares the measured width indicating signal to a predetermined design width value and in turn provides an analogue correction command signal dependent upon the amount of error in the width, to width correction motor 756 control circuitry. The correction motor control circuitry also receives a feedback signal from the correction motor angular displacement sensor 757. Based on these two signals the correction motor control circuitry actuates the correction motor which in turn drives mechanical linkage 752 etc. to pivot one guide means 712 (in the embodiment of FIG. 7) or both guide means 710, 712 (in the embodiment of FIG. 8) to provide the necessary angular alignment of the guide means to stretch the film web to achieve the predetermined design width at the measuring station. The control algorithm will, of course, be dependent upon physical properties of the film web such as thickness, strength, elastic return characteristics, etc. and will also be dependent upon the distance of the lateral stretch control unit 701, 901 from the laminating nip and the base film web tension and operating speed. Such properties are well understood and a control algorithm taking such physical properties into account may be provided by one of ordinary skill in the art without undue experimentation.

Another embodiment of the invention adapted specifically for web lateral position control, is illustrated in FIGS. 14–20. Moving web 402 has a first and second longitudinally extending edge 404, 406 which are positioned parallel to a web central longitudinal axis 408. When the web is positioned at a laterally centered location on certain web handling components, e.g. 424, 428, of the web line, the central longitudinal axis 408 of the web will be positioned at a known fixed distance "b" from a fixed longitudinal reference axis such as 412 associated with a sensing device 414. Lateral misalignment of the web will cause the web central longitudinal axis 408 to be positioned at distances from fixed reference axis 412 other than distance "b". A plurality of substantially identical, generally transversely extending, longitudinally spaced apart indicia 401, 403, etc., sometimes also referred to herein as "marks", are provided on the web to facilitate monitoring of the web relative lateral alignment. A pair of photo-electric scanners or "photo eyes" 414, 416, which may be identical to the photoelectric scanners previously described herein, are positioned to detect the passage of certain portions of the lateral alignment indicia 401, 403, etc. Each scanner 414, 416 has an associated scan path axis 410, 412 extending longitudinally of the web. In the embodiment illustrated in FIGS. 14–17 and 19–20, the web moves in the direction 417 when used in association with scanners 414, 416. However, the lateral alignment indicia 401, 403 are so constructed in some embodiments such as illustrated in FIG. 14, as to enable their use when the web is moved in either direction. Thus, a second pair of scanners 418, 420 as shown in phantom in FIG. 14, may be used to detect the indicia when the web is moved in direction 421 opposite to direction 417. A data processing unit 422 which is adapted to receive certain monitoring signals and to output certain control signals may comprise a programmable computer or hard wired circuitry or a combination thereof for performing the various data processing functions described below. The implementation of the various data processing functions described below will be obvious to a person having ordinary skill in the art from this disclosure. Each photoelectric scanner 414, 416 produces a signal indicative of the sensing of a darkened area passing therebelow and thus may produce a signal having square wave pulses therein indicative of the passage of indicia 401, 403 therebelow. The indicia 401, 403 are preferably provided in a scanpath area which is otherwise unobstructed. However, the present invention may also be implemented in an obstructed field scan path by using appropriate image recognition methods of the type described in U.S. patent application Ser. No. 838,383 filed Mar. 11, 1986 for OBSTRUCTED FIELD INDICIA SENSING DEVICE of James William Ditto et al., which is hereby incorporated by reference herein for all that it contains. The indicia detection signals generated by photo eyes 414, 416 are provided to the data processing means 422. An encoder unit 424, operatively mounted on a roll 426, which web 402 engages in non-slipping contact, provides an encoder pulse signal having a fixed number of encoder pulses per linear unit of web travel. The encoder pulse signal is also provided to the data processing unit 422. The data processing unit 422 performs certain data processing functions based on the input of the signals from the photo eyes 414, 416 and the encoder 424 and provides a control signal output to a web lateral shifting assembly 428 which causes the web 402 to be shifted laterally at a rate proportionate to the value of the control signal provided by data processing unit 422. Apparatus and circuitry for providing lateral shifting movement of a web in response to control signals is well known in the art and may be of the type such as described in U.S. patent application Ser. No. 882,391 filed July 7, 1986 for WEB LATERAL CONTROL SYSTEM of Richard Glen Piller which is hereby incorporated by reference for all that it contains.

In another embodiment of the invention, web lateral control is based upon the lateral position of certain graphics patterns 432 which are printed on the web 402 rather than on the position of the physical web 402. Graphics pattern 432 may have a first lateral edge 434 associated with web edge 404 and a second lateral edge 436 associated with web edge 406. The lateral position of the graphics pattern 432 on the web 402 may be somewhat variable due to relative lateral shifting etc. in the printing assembly used to print the graphics such that the gap distance "c" between a lateral edge 434 of the graphics pattern and a lateral edge 404 of the physical web may vary over the length of the web. In this embodiment, an edge sensor 440 which may be of an identical type to that described in U.S. patent application Ser. No. 882,391 of Piller referenced above, is used to sense the physical edge 404 of the web and to provide control signals to web lateral shifting assembly 428 to maintain the web edge 404 at a relatively constant lateral alignment position relative the edge sensor 440. The edge sensor itself is mounted on a lateral movement assembly 442 which may comprise, for example, a drive motor 444 and worm gear assembly 446 operably connected to the lateral edge sensor 440 which moves the lateral edge sensor laterally back and forth by an amount proportionate to a control signal generated by processing unit 422. This control signal from processing unit 422 is in turn derived from information provided by photo-sensors 414, 416 and encoder unit 414 based upon the sensing of lateral position indicating indicia 401, 403 as described above. However, in this embodiment the lateral position of indicia 401, 403 is fixedly associated with the graphics pattern 432 rather than the physical web. In this embodiment, for example, the indicia 401, 403 may be printed at the same time as other graphics on the web. Thus, in this embodiment, a control system is provided in which the lateral position of the web is continuously monitored by a web edge sensor and the web is appropriately laterally adjusted based upon the relative alignment of edge 404 with the edge sensor.

However, the position of the edge sensor itself is shifted to correct for any deviation in gap distance 438 based upon the periodic sensing of indicia 401, 403, etc. and control signals generated thereby. Thus, the resultant control of such a system centers the web graphics rather than the physical web with respect to a fixed reference axis such as 412.

The method by which the marks 401, 403 and alternative embodiments thereof, such as illustrated in FIGS. 15-20, are employed to determine the lateral position of an associated web or web graphics will now be described.

As illustrated in FIGS. 15-20, the lateral position indicating indicia 401, 403, etc. may be embodied in a number of slightly different shapes. However, each of the different indicia configurations shown in FIGS. 15-20, comprise certain common features which will now be described collectively. Each indicia comprises a leading edge 454 and a parallel trailing edge 456 associated with a particular direction 417 of web movement. Of course, when the web movement in reversed as indicated at 421, the edge portion of the mark which leads and the edge portion of the mark which trails, are also reversed. Although each of the marks shown in FIGS. 15-20 is shown in outline form for purposes of clarity, it will be understood that actual marks used are preferably completely dark from leading edge to trailing edge to facilitate detection by photo eye units 414, 416. Each indicia comprises a first linear portion 460 which is diagonally positioned relative a longitudinal axis 408 of the web or alternatively, a longitudinal axis of the web graphics, e.g. 434. The particular angle at which diagonal linear portion 460 is oriented with such a longitudinal axis is preferably between 30 degrees and 60 degrees and, most preferably, is 45 degrees. Each linear diagonal portion 460 comprises a first end 462 and a second end 464 which are connected with a second laterally extending linear portion 466 and a third laterally extending linear portion 468 respectively which are preferably located perpendicular to an associated web longitudinal axis. First photoelectric scanner 414 is positioned to sense a preselected point 461 on diagonal portion 460 when the web is in a perfectly aligned position. Sensor 414 will therefor sense other laterally offset points of diagonal portion 460 when the web is moderately misaligned and will sense either second laterally extending portion 466 or third laterally extending portion 468 if the web is substantially misaligned. Each indicia also comprises a laterally extending portion 465 which has a fixed longitudinal spacing with respect to diagonal portion 460. Portion 465 is adapted to be sensed by second photoelectric scanner 416 which is positioned at a known longitudinal spacing from first photoelectric scanner 414. The web travel distance between the sensing of portion 465 by scanner 416 and the sensing of an associated first, second or third portion 460, 466, 468 of the same mark by scanner 414 is used to determine the relative lateral displacement of the web. In the embodiments illustrated in FIGS. 15-19, indicia portion 465 is the same as indicia portion 466. In the embodiment illustrated in FIG. 20, linear portion 465 is different than linear portion 466 in that it is positioned on the leading edge of the indicia and portion 466 is positioned on the trailing edge of the indicia. It may be seen from the drawing that each of the different embodiments of the marks shown in FIGS. 15-20, except for FIG. 18, comprise two different portions which present identical linear portions to photo eyes 418, 420 as that presented to photo eyes 414, 416 when the web is moved in direction 421 rather than 417. For example, in FIG. 15 portions 860, 866, 868 and 865 correspond to portions 460, 464, 466 and 465, respectively. It will also be appreciated from the above that a web relative alignment state may be determined by the relative position of the scan path 412 of photoelectric scanner 414 relative certain portions of a mark 401, 403. These relative alignment states will be defined with reference to FIGS. 19 which show various relative positions of scanner 414 longitudinal reference axis 412. A web is considered to be in an "aligned state" when the path 412 of scanner 414 passes through a predetermined central point 461 on diagonal portion 460 as indicated at "x". The web is considered to be in a "moderately misaligned state" when the scanner 414 path is oriented, such as indicated at "y", so as to pass through diagonal portion 460 at a point other than 461. The web is considered to be in a "substantially misaligned state" when the scanner axis 412 is positioned such as at "Z" or "Z'" in intersecting relationship with linear portions 466 or 468.

It will also be appreciated from the above that the relative distance of web travel occurring between a detection pulse generated by scanner 414 in response to detecting a portion of diagonal linear portion 460 and the generation of a signal pulse from scanner 416 associated with the detection of laterally extending linear portion 465 will vary depending upon the degree of lateral misalignment of the web when the web is in a moderately misaligned state. However, when the web is in a substantially misaligned state, the distance between a pulse generated by sensor 414 and a pulse generated by sensor 416 will be a constant value proportionate either to the distance between 465 and 466 or between 465 and 468. The control system of the present invention is adapted to provide a relative slow rate control response which is proportional to the distance between scanner pulses 414 and 416 when the web is in a moderately misaligned state and is also adapted to provide a relatively high constant rate response when the web is in a substantially misaligned state associated with the alignment of scanner 414 with either web portion 468 or 466. Of course, if the web is so misaligned as to place scanner path 414 beyond the detection of any portion of a indicia 401, 403, etc., then the control system may become "lost". However, such extremely large scale misalignment is rarely encountered.

Figure 21:
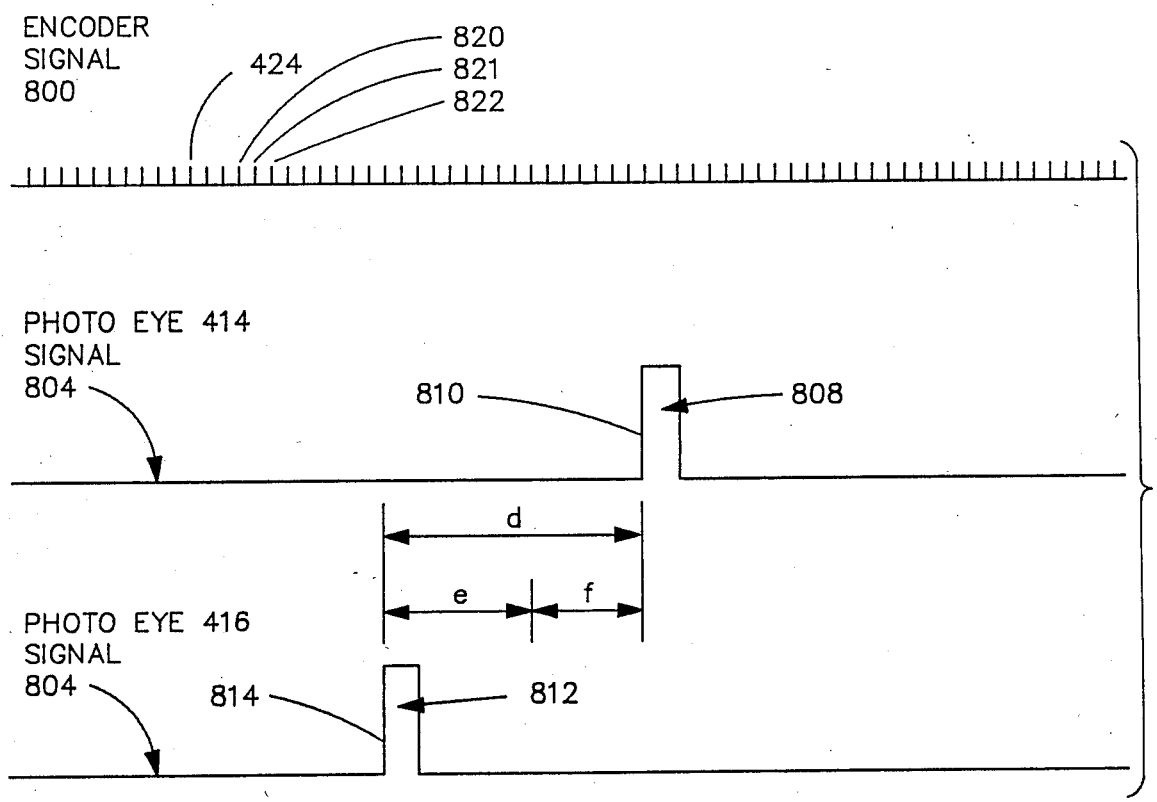
FIG. 21 is a schematic illustration of various monitoring signals produced by the apparatus of FIG. 14.

Typical indicia detection signals and encoder signals associated with the detection of indicia in various states of alignment are illustrated in FIG. 21.

Various reference distances used in the lateral position control system of the present invention are illustrated in FIG. 19. "$p_0$" is representative of the longitudinal distance between laterally extending linear portion 465 and central point 461 in diagonal portion 460. "$p_1$" represents the longitudinal distance between laterally extending linear portion 465 and laterally extending linear portion 468. "$p_2$" is representative of the distance between laterally extending linear portion 466 and laterally extending line portion 465, which, in FIG. 19, are the same line. Thus, in FIG. 19, "$p_2$" is equal to zero. Referring now to FIG. 21, it will be seen that encoder 424 produces a signal 800 having a plurality of pulses 820, 821, 822, etc. wherein each encoder pulse is representative of a fixed distance of web travel. An encoder having a resolution of several hundred pulses per inch is preferred. A photo eye signal produced by photo eye 414 is illustrated at 802 and a photo eye signal produced by photo eye 416 is illustrated at 804. Numeral 808 represents a pulse having a leading edge 810 which is representative of the sensing of linear portion 460, 466, or 468 Of a mark. Numeral 812 represents a pulse having a leading edge 814 which is indicative of the sensing of a linear portion 465 of the same mark as associated with pulse 808 portion 810 of photo eye signal 802. The number of encoder pulses occurring during an interval "d" is representative of the distance of web travel between the sensing of an indicia portion 460, 466, or 468 by photo eye 414 and the sensing of indicia line portion 465 by encoder 416. (In the illustrated embodiment, pulse 812 occurs first in time because of the upstream position of photo eye 416 relative to photo eye 414.) Reference letter "e" is representative of the known longitudinal distance between photo eye 414 and 416 which may be stored in computer 424 memory. Reference letter "f" is representative of the longitudinal distance of web travel between the point on an indicia detected by photo eye 414 and the point on the same indicia detected by photo eye 416. The value of "f" may be determined by subtracting the known value "e" from the measured distance value "d". The value of the control signal output by data processing unit 422 is dependent upon the determined value of "f", the variable longitudinal distance between detected portions of an indicia. When the determined value of "f" is equal to "$p_0$", then the web is in laterally aligned relationship with an associated reference axis and the control signal provided by data processing unit 422 indicates that no lateral alignment changes are to be made. If "f" is not equal to "$p_0$" but is less than "$p_1$" associated with the sensing of linear portion 468 and is greater than "$p_2$" associated with the sensing of linear portion 466, then the data processing unit generates a relatively low displacement rate lateral alignment control response which is proportionate to the value of "f". If "f" is greater than "$p_1$", then the data processing unit generates a constant, relatively high displacement rate, lateral displacement signal to move the web in a first lateral direction. If "f" is less than "$p_2$", then the data processing unit 422 provides a constant, relatively high displacement rate, lateral displacement response which causes displacement of the web in the lateral direction opposite the first lateral direction. These lateral displacement signals generated by the data processing unit may be used to actuate a web lateral movement assembly such as 428 directly or, as the case described above where control is based on graphics location, by actuating an assembly 442 which moves an edge sensor 440 laterally to compensate for variation between the web and web graphics and in which the edge sensor 440 issues direct control commands.

Thus, from the above it will be understood that the control system shifts the web laterally at a rate dependent upon the relative lateral displacement of the web when the displacement is a relatively moderate value such that the associated photo eye (scanner) path 12 intersects diagonal linear portion 460 of an associated indicia and the web is moved laterally at a constant rate when the misalignment is a substantial misalignment causing the path 412 to intersect indicia portion 466 or indicia portion 468. The direction of lateral displacement is, of course, dependent upon which of the laterally extending portions 466 or 468 is aligned with scanner path 412. For example, referring to the embodiment of FIG. 19, if scanner path 412 were to coincide with axis "Z", then the web would be shifted laterally in a direction corresponding to "up" on the drawing to bring the web back into proper lateral alignment with the scanner path 412.

The various embodiments of the lateral alignment indicia 401, 403 illustrated in FIGS. 15–20 show various embodiments of the indicia which may be used on webs having different graphics patterns in order to ensure that the portions of the indicia aligned with photo eyes 414, 416 or alternately photo eyes 418, 420 will be positioned in an unobstructed sensing path. It will also be appreciated from the above disclosure that the provision of laterally extending portions 466, 468 at the ends of diagonal portion 460 enable a mark to be provided in a relatively small longitudinal space. If diagonal portion 460 were provided of sufficient length so as to intercept photo eye 414 in substantial lateral misalignment situations, it would necessarily extend longitudinally much farther than in the illustrated embodiments. Thus, use of marks such as illustrated in FIGS. 15–20 substantially reduce the amount of web space which must be devoted to a lateral alignment indicia as compared to an indicia having a diagonal portion only.

FIG. 20 represents an extremely compact mark configuration which is adapted for use with a single scanner 480. In this mark configuration, a leading edge portion of the mark 454 comprises the linear portion 465 of the mark which is longitudinally spaced relative the diagonal portion of the mark 460 and which is adapted to be detected by second photo eye 416 in the other embodiments. In the embodiment of FIG. 20, the diagonal portion 460 and two associated laterally extending portions 466 and 468 are positioned at the trailing edge of the mark. Thus, the encoder produces a single pulse when detecting a mark of the type illustrated in FIG. 20 and the pulse width of that pulse is representative of the distance of web travel associated with the value "f" in the example described in FIG. 21. An even more compact arrangement of the mark illustrated in FIG. 20 may of course be made by removing one lateral half of the mark if it is only necessary to run the web in a single longitudinal direction.

It is contemplated that the inventive concepts herein described may be variously otherwise embodied and it is intended that the appended claims be construed to include alternative embodiments of the invention except insofar as limited by the prior art.

What is claimed is:

1. A method of controlling the lateral position of a moving web of material having a central longitudinally extending web axis extending generally parallel to the direction of movement of the web so as to maintain the central longitudinally extending axis of the web at a substantial constant lateral position relative a fixed longitudinally extending axis associated with a fixed web alignment station comprising the steps of:

(a) providing a series of longitudinally spaced apart, substantially identical, generally transversely extending indicia in a longitudinally extending indicia path parallel to the central longitudinal axis of the web, each indicia comprising a first relatively short length linear portion extending diagonally of a longitudinal axis of the web and having a first end and a second end, a second linear portion extending outwardly from the first end of the first linear portion substantially perpendicular to a longitudinally extending axis of the web, and a third linear portion extending outwardly from the second end of the first linear portion substantially perpendicular to a longitudinal axis of the web;

(b) providing a first indicia sensing means at a fixed location opposite the moving web at a position whereat a selected central point of said first linear portion of each indicia is sensed thereby when the web is in a laterally centered state relative said fixed longitudinal reference axis; and whereby points other than said selected central point of said diagonal portion of each indicia are sensed by said first sensing means when the web is in a moderately laterally misaligned state and whereby a point on one of said second and said third linear portion of an indicia is sensed thereby when said web is in a substantially laterally misaligned state;

(c) providing a second indicia sensing means at a fixed location opposite the moving web and laterally spaced from the first indicia sensing means which is adapted to sense a portion of each indicia extending perpendicular of a web longitudinal axis which portion is located at a fixed longitudinal distance from said first diagonally extending portion of each indicia;

(d) generating a first sensing means signal representative of the detection of indicia passing below said first sensing means and generating a second sensing means signal representative of the detection of indicia passing below said second sensing means;

(e) determining the longitudinal distance of web travel occurring between a first sensing means signal portion produced by the sensing of an indicia and a second sensing means signal portion produced by sensing of the same indicia;

(f) determining whether the web is in an aligned, moderately misaligned or substantially misaligned state based upon the determined distance of step (e);

(g) determining the amount of lateral misalignment when the web is in a moderately misaligned state based upon the determined distance of step (e);

(h) moving the web laterally at a fixed relatively fast rate at least until the next following indicia is sensed when the web is determined to be in said substantial misalignment state and moving the web laterally at a rate proportionate to the determined lateral misalignment when the web is determined to be in a moderately misaligned state and maintaining the web at the same lateral position when the web is determined to be in an aligned state.

2. A method of controlling the lateral position of a moving web of material having a central longitudinally extending web axis extending generally parallel to the direction of movement of the web so as to maintain the central longitudinally extending axis of the web at a substantial constant lateral position relative a fixed longitudinally extending axis associated with a fixed web alignment station comprising the steps of:

(a) providing a series of longitudinally spaced apart, substantially identical, generally transversely extending indicia in a longitudinally extending indicia path parallel to the central longitudinal axis of the web, each indicia comprising a first relatively short length linear portion extending diagonally of a longitudinal axis of the web and having a first end and a second end, a second linear portion extending outwardly from the first end of the first linear portion substantially perpendicular to a longitudinally extending axis of the web, and a third linear portion extending outwardly from the second end of the first linear portion substantially perpendicular to a longitudinal axis of the web and a fourth linear portion extending parallel to said second and third linear portions in longitudinally spaced, adjacent, substantially laterally coextensive relationship with said first, second, and third linear portions;

(b) providing an indicia sensing means at a fixed location opposite the moving web whereat said fourth portion of each indicia is sensed thereby at a first point in time and one of said first, second, and third indicia are sensed thereby at a second point in time, a selected central point of said first linear portion of each indicia is sensed thereby when the web is in a laterally centered state relative said fixed longitudinal reference axis; and whereby points other than said selected central point of said diagonal portion of each indicia are sensed by said first sensing means when the web is in a moderately laterally misaligned state and whereby a point on one of said second and said third linear portion of an indicia is sensed thereby when said web is in a substantially laterally misaligned state;

(c) determining the longitudinal distance of web travel occurring between said two points in time;

(d) determining whether the web is in an aligned, moderately misaligned or substantially misaligned state based upon the determined distance of step (c);

(e) determining the amount of lateral misalignment when the web is in a moderately misaligned state based upon the determined distance of step (c);

(f) moving the web laterally at a fixed relatively fast rate at least until the next following indicia is sensed when the web is determined to be in said substantial misalignment state and moving the web laterally at a rate proportionate to the determined lateral misalignment when the web is determined to be in a moderately misaligned state and maintaining the web at the same lateral position when the web is determined to be in an aligned state.

3. An apparatus for controlling the lateral position of a moving web of material having a central longitudinal axis extending generally parallel to the direction of the web so as to maintain the central longitudinal axis of the web at a substantially constant lateral position relative a fixed longitudinally extending reference axis associated with a fixed web alignment station comprising:

(a) a series of longitudinally spaced apart, substantially identical, generally transversely extending indicia positioned on the web in a longitudinally extending indicia path parallel to the central longitudinal axis of the web, each indicia comprising a first relatively short length linear portion extending diagonally of a longitudinal axis of the web and having a first end and a second end, a second linear portion extending outwardly from the first end of the first linear portion substantially perpendicular to a longitudinally extending axis of the web, and a third linear portion extending outwardly from the second end of the first linear portion substantially perpendicular to a longitudinal axis of the web;

(b) a first indicia sensing means at a fixed location opposite the moving web at a position whereat a selected central point of said first linear portion of each indicia is sensed thereby when the web is in a laterally centered state relative said fixed longitudinal reference axis; and whereby points other than said selected central point of said diagonal portion of each indicia are sensed by said first sensing means when the web is in a moderately laterally misaligned state and whereby a point on one of said second and said third linear portion of an indicia is sensed thereby when said web is in a substantially laterally misaligned state for generating a first sensing means signal representative of the detection of indicia passing below said first sensing means;

(c) a second indicia sensing means at a fixed location opposite the moving web and laterally spaced from the first indicia sensing means which is adapted to sense a portion of each indicia extending perpendicular of a web longitudinal axis which portion is located at a fixed longitudinal distance from said first diagonally extending portion of each indicia for generating a second sensing means signal representative of the detection of indicia passing below said second sensing means;

(d) distance measuring means for determining the longitudinal distance of web travel occurring between a first sensing means signal portion produced by the sensing of an indicia and a second sensing means signal portion produced by sensing of the same indicia;

(e) data processing means for determining whether the web is in an aligned, moderately misaligned or substantially misaligned state based upon said determined distance between indicia portions and for determining the amount of lateral misalignment when the web is in a moderately misaligned state based upon said determined distance between indicia portions and for generating signals representative of said determined alignment state and misalignment amount; and (f) web lateral displacement means for moving the web laterally at a fixed relatively fast rate at least until the next following indicia is sensed when the web is determined to be in said substantial misalignment state and for moving the web laterally at a rate proportionate to the determined lateral misalignment when the web is determined to be in a moderately misaligned state and for maintaining the web at the same lateral position when the web is determined to be in an aligned state.

4. An apparatus for controlling the lateral position of a moving web of material having a central longitudinal axis extending generally parallel to the direction of the web so as to maintain the central longitudinal axis of the web at a substantially constant lateral position relative to fixed longitudinally extending reference axis associated with a fixed web alignment station comprising:

(a) a series of longitudinally spaced apart, substantially identical, generally transversely extending indicia positioned on the web in a longitudinally extending indicia path parallel to the central longitudinal axis of the web, each indicia comprising a first relatively short length linear portion extending diagonally of a longitudinal axis of the web and having a first end and a second end, a second linear portion extending outwardly from said first end of the first linear portion substantially perpendicular to a longitudinally extending axis of the web, and a third linear portion extending outwardly from said second end of the first linear portion substantially perpendicular to a longitudinal axis of the web and a fourth linear portion extending parallel to said second and third linear portions in longitudinally spaced, adjacent, substantially laterally coextensive relationship with said first, second, and third linear portions;

(b) indicia sensing means at a fixed location opposite the moving web at a position whereat a selected central point of said first linear portion of each indicia is sensed by said sensing means when the web is in a laterally centered state relative said fixed longitudinal reference axis; and whereby points other than said selected central point of said first linear portion of each indicia are sensed by said sensing means when the web is in a moderately laterally misaligned state and whereby a point on one of said second and said third linear portion of an indicia are sensed by said sensing means when said web is in a substantially laterally misaligned state, for sensing said fourth portion of an indicia at a first point in time and for sensing one of said first, second and third indicia portions at a second point in time and for generating a sensing means signal representative of the detection of said indicia portions;

(c) distance measuring means for determining the longitudinal distance of web travel occurring between a sensing means first signal portion produced by the sensing of a fourth portion of an indicia and a sensing means second signal portion produced by the sensing of one of said first, second and third indicia portions of the same indicia;

(d) data processing means for determining whether the web is in an aligned, moderately misaligned or substantially misaligned state based upon said determined distance between indicia portions and for determining the amount of lateral misalignment when the web is in a moderately misaligned state based upon said determined distance between indicia portions and for generating signals representative of said determined alignment state and misalignment amount; and (e) web lateral displacement means for moving the web laterally at a preset relatively fast rate at least until the next following indicia is sensed when the web is determined to be in said substantial misalignment state and for moving the web laterally at a relatively moderate rate proportionate to the determined lateral misalignment when the web is determined to be in a moderately misaligned state and for maintaining the web at the same lateral position when the web is determined to be in an aligned state.

5. A method of controlling the lateral position of a moving web of material having a central longitudinally extending web axis extending generally parallel to the direction of movement of the web so as to maintain the web in a laterally centered position, comprising the steps of:

(a) providing a series of substantially identical repeating alignment indicia on the web arranged along a longitudinally extending indicia axis of the web, a diagonal portion of each indicia being associated with a laterally centered state of the web and a moderately misaligned state of the web, at least one laterally extending portion of each indicia being associated with a substantially misaligned state of the web;

(b) detecting the passage of a portion of alignment indicia at a fixed station along the web;

(c) determining which portion of an alignment indicia was detected in step (b);

(d) determining the exact degree of misalignment and moving the web laterally toward a centered position based upon the degree of misaligned in response to a determination that said diagonal portion of an indicia was detected; e) moving the laterally toward a centered position at a preset rate in response to a determination that said laterally extending portion of an indicia was detected.

6. The invention of claim 5 wherein the step of determining which portion of an alignment indicia was detected comprises:

(a) detecting a laterally extending indicia portion associated with distance measurement and positioned at a preset distance from said at least one laterally extending indicia portion associated with a substantially misaligned stated of the web;

(b) measuring the distance of web travel occurring between the detection of said laterally extending indicia portion associated with distance measurement and the detection of one of said indicia portions associated with a centered or moderately misaligned state and said indicia portion associated with a substantially misaligned state;

(c) comparing the measured distance to predetermined values associated with moderately misaligned and substantially misaligned states of the web.

7. The invention of claim 6 wherein determining the exact degree of misalignment when the web is determined to be in a moderately misaligned state comprises comparing the measured distance of web travel occurring between an indicia portion associated with distance measurement and an indicia portion associated with a centered or moderately misaligned state of the web with a predetermined value associated with a centered state of the web.

8. The invention of claim 7 wherein the step of detecting a laterally extending indicia portion associated with distance measurement comprises using the same indicia detection device as used to detect said other indicia portions with web alignment.

9. The invention of claim 7 wherein the step of detecting a laterally extending indicia portion associated with distance measurement comprises using a different detection device from that used to detect said other indicia portions.

10. The invention of claim 5 wherein each of the steps of moving the web laterally comprises:

(a) adjusting the lateral position of a web edge sensing device which is operatively associated with the web;

(b) moving the web in response to the relative lateral position of the associated web edge with respect to the edge sensing device.

11. An apparatus for controlling the lateral position of a moving web for maintaining the web in a relatively centered position at a fixed alignment station comprising:

(a) a repeating series of longitudinally spaced apart substantially identical alignment indicia positioned along a web longitudinal axis, each alignment indicia comprising a diagonal portion associated with a centered state of the web at a predetermined central point thereon and associated with a moderately misaligned state of the web at other points thereon, at least one laterally extending portion associated with a substantially misaligned state of the web, and a laterally extending portion associated with distance measurement positioned at a predetermined longitudinal distance from said laterally extending portion associated with a substantially misaligned state of the web;

(b) indicia detection means positioned at a fixed location relative the web at a position in lateral alignment with said central point on said diagonal portion when the web is in a laterally centered state for detecting the passage of various portions of said alignment indicia and generating a detection signal indicative thereof;

(c) web travel monitoring means for providing a web travel signal indicative of web travel distance;

(d) data processing means for receiving and processing said indicia detection signal and said web travel signal for determining whether said web is in a centered state or a moderately misaligned state or a substantially misaligned state and for generating a control signal in response thereto, said control signal being of a first constant preset value in response to a determination of a centered state, a second preset value in response to a determination of a substantially misaligned state, and a selectively variable value in response to a determination of a moderately misaligned state;

(e) web movement means for receiving said control signal from said data processing means and for moving the web laterally in response thereto and at a rate proportionate to the value thereof.

12. The invention of claim 11 wherein said web movement means comprises a mechanical assembly actuated by a web edge sensor signal from an edge sensor means operatively associated with a physical lateral edge moveable relative said web edge in response to said control signal from said data processing means.

* * * * *

UNITED STATES PATENT AND TRADEMARK OFFICE
CERTIFICATE OF CORRECTION

PATENT NO. : 4,888,717

DATED : December 19, 1989

INVENTOR(S) : James W. Ditto, James W. Jensen

It is certified that error appears in the above-identified patent and that said Letters Patent is hereby corrected as shown below:

Column 8, line 3, "by-wrap" should read --by S-wrap--; and line 14, "1 53" should read --153--.

Column 11, line 58, "he" should read --the--.

Column 15, line 63, "20" should read --720--.

Column 16, line 39, "ob" should read --of--.

Column 21, line 58, "12" should read --412--.

Claim 4, Col. 25, line 51, "to" should be --a--;

line 62, "the" should be --said--.

Claim 4, Col. 26, line 13, "a point" should be --points--.

Claim 5, Col. 27, line 5, "misaligned" should read --misalignment--;

Claim 5, line 7, after "the" insert --web--; and element (e) should start a new paragraph;

Claim 6, Col. 27, line 18, "stated" should read --state--.

UNITED STATES PATENT AND TRADEMARK OFFICE
CERTIFICATE OF CORRECTION

PATENT NO. : 4,888,717

DATED : December 19, 1989

INVENTOR(S) : James W. Ditto, James W. Jensen

It is certified that error appears in the above-identified patent and that said Letters Patent is hereby corrected as shown below:

Claim 12, Col. 28, line 51, after "edge" (first occurrence) insert --portion of the web and wherein said edge sensor is laterally--.

Signed and Sealed this

Fifteenth Day of January, 1991

Attest:

HARRY F. MANBECK, JR.

Attesting Officer

Commissioner of Patents and Trademarks